(12) United States Patent  
Ono

(10) Patent No.: US 8,363,245 B2  
(45) Date of Patent: Jan. 29, 2013

(54) PRINTING SYSTEM, PRINT PROCESSING METHOD AND PROGRAM

(75) Inventor: Takashi Ono, Inagi (JP)

(73) Assignee: Canon Kabushiki Kaisha (JP)

( * ) Notice: Subject to any disclaimer, the term of this patent is extended or adjusted under 35 U.S.C. 154(b) by 1563 days.

(21) Appl. No.: 11/758,827

(22) Filed: Jun. 6, 2007

(65) Prior Publication Data

US 2007/0285711 A1 Dec. 13, 2007

(30) Foreign Application Priority Data

Jun. 8, 2006 (JP) ................................ 2006-159991

(51) Int. Cl.
*G06F 3/12* (2006.01)

(52) U.S. Cl. .................. 358/1.15; 358/1.1; 715/255

(58) Field of Classification Search ............... 358/1.15, 358/1.14, 1.1, 1.9; 715/208, 221–226, 255
See application file for complete search history.

(56) References Cited

U.S. PATENT DOCUMENTS

| 7,126,704 | B2 * | 10/2006 | Miura et al. | 358/1.14 |
| 7,672,991 | B2 * | 3/2010 | Moreau et al. | 709/203 |
| 2004/0120013 | A1 * | 6/2004 | Elkady et al. | 358/1.18 |

FOREIGN PATENT DOCUMENTS

| JP | 2000-118085 A | 4/2000 |
| JP | 2002-297346 A | 10/2002 |
| JP | 2003-241919 A | 8/2003 |
| JP | 2004-164014 A | 6/2004 |
| JP | 2005-292903 A | 10/2005 |

OTHER PUBLICATIONS

Office action issued in corresponding Japanese patent application 2006-159991, dated Apr. 19, 2011.

* cited by examiner

*Primary Examiner* — King Poon  
*Assistant Examiner* — Lawrence Wills  
(74) *Attorney, Agent, or Firm* — Rossi, Kimms & McDowell LLP

(57) ABSTRACT

A printing system that adopts an SBC system in which a load at a server is alleviated when executing printing to enable printing to be performed smoothly. In the printing system, a client terminal, a server, and an image forming apparatus are connected to each other through a network. The client terminal specifies data among stored data in the server and sends a print execution request to the server. The server receives the print execution request, creates print-related information relating to the specified data, and sends it to the client terminal. The client terminal judges whether or not print data generation processing with respect to the specified data is possible at the client terminal based on the print-related information, and send the judgment result to the server. The server allocates the print data generation processing to either the server or the client terminal based on the judgment result.

6 Claims, 29 Drawing Sheets

PRINTING SYSTEM, PRINT PROCESSING METHOD AND PROGRAM

BACKGROUND OF THE INVENTION

1. Field of the Invention

The present invention relates to a printing system, a print processing method, and a program. More particularly, the present invention relates to a printing system that has a client terminal, a server, and an image forming apparatus which are connected to each other through a network, and that performs printing at the image forming apparatus based on data that is stored in the server in accordance with a print execution request from the client terminal, a print processing method that is applied to the printing system, and a program for causing a computer to execute the print processing method.

2. Description of the Related Art

Conventionally, in a printing system that is configured by information processing apparatuses and an image forming apparatus that are connected to each other through a network, print processing of documents or image data that are stored on the information processing apparatuses is executed by the image forming apparatus. More specifically, this print processing is performed by the information processing apparatus converting the documents or image data or the like into printer description language using an internal printer driver to create print data, and then sending the print data to the image forming apparatus through the network.

Recently, in an attempt to strengthen information security and reduce the cost for introducing a printing system, there has been a trend towards adopting a computer system based on a server (hereafter, referred to as "SBC system" (Server Based Computing System)) for printing systems.

In a printing system that adopts the SBC system, the management of documents or image data and installation or execution of application programs is not performed by each client (information processing apparatus), but is concentrated at the server. Further, each client is a thin client that has only resources such as a memory having a minimum storage capacity and, a hard disk, etc. Out of the information obtained by execution of processing at the server, each client receives from the server only the information that represents the difference between information that was already received and the information obtained by the processing.

A server used with this printing system is, for example, configured from a platform on which metaframes or the like are installed.

FIG. 25 is a view showing the conventional configuration of the SBC system.

In FIG. 25, in an SBC system 2500, a client terminal 1001 and a server 1003 are connected to each other through a network 1004. The client terminal 1001 comprises an input device 1001a such as a keyboard, a mouse or the like and a display 1001b.

FIG. 26 is a flowchart showing the procedure of basic processing to be executed by the client terminal 1001 in the SBC system 2500 illustrated in FIG. 25.

In FIG. 26, first the client terminal 1001 stands by until a user performs an input operation with respect to the input device 1001a such as the keyboard or mouse while referring to contents that are displayed on the display 1001b (NO at step S2001). Upon an input operation being performed (YES at step S2001), the client terminal 1001 sends an operation contents notification 1 (see FIG. 25) to the server 1003 via the network 1004 (step S2002), and waits for reception of a display image 2 (see FIG. 25) that is sent from the server 1003 (NO at step S2003). Upon receiving the display image 2 (YES at step S2003), the client terminal 1001 displays the display image 2 on the display 1001b (step S2004). The process then returns to step S2001.

FIG. 27 is a flowchart showing the procedure of basic processing to be executed by the server 1003 in the SBC system 2500.

In FIG. 27, first the server 1003 waits for reception of the operation contents notification 1 that is sent from the client terminal 1001 through the network 1004 (NO at step S2101). Upon receiving the operation contents notification 1 (YES at step S2101), the server 1003 executes processing in accordance with the operation contents notification 1 (step S2102) to generate the display image 2 (step S2103). The display image 2 that is generated is sent to the client terminal 1001 through the network 1004 (step S2104). The process then returns to step S2101.

Further, the following system is already proposed as a printing system that uses an SBC system. FIG. 28 is a view showing a variation of the conventional configuration of an SBC system. This second configuration is disclosed, for example, in Japanese Laid-Open Patent Publication (Kokai) No. 2002-297346.

In FIG. 28, in an SBC system 2800, a client terminal 1101 comprising a display 1101a and an input device 1101b, an image forming apparatus 1102 that performs print processing of print data that is sent, and a server 1103 that holds document or image data in a manner in which the data can be developed by an application program are connected to each other through a network 1104.

In response to an operation contents notification from the client terminal 1101, the server 1103 develops the documents or image data using an application program. The client terminal 1101 receives only a display image that is included in the documents or image data developed by the application program at the server 1103, and outputs the display image onto the display 1101a.

In the SBC system 2800, when the client terminal 1101 is to cause the image forming apparatus 1102 to perform print processing, a printer driver is installed beforehand at the server 1103. Thus, when the client terminal 1101 logs in to the server 1103, the logical printer of the image forming apparatus 1102 to be used by the client terminal 1101 is automatically created at the server 1103 to enter a state in which printing is possible. In this case, when the client terminal 1101 sends a print execution notification la (see FIG. 28) to the server 1103, print data that was converted to printer description language by the printer driver is created on the server 1103, and the print data 2a (see FIG. 28) is sent to the image forming apparatus 1102 through the client terminal 1101 and printed.

However, according to the SBC system 2800 as described above, the load is concentrated at the server 1103 during print execution. More specifically, when there is a print execution notification from the client terminal 1101, the server 1103 not only runs an application program, develops the selected documents or image data, creates image data for display on the display 1101a, and sends the image data to the client terminal 1101, but also needs to perform conversion to printer description language and creation of print data at the time of print execution, and send the created print data to the image forming apparatus 1102 via the client terminal 1101. There is thus a problem that printing is not carried out smoothly.

SUMMARY OF THE INVENTION

The present invention has been made in consideration of the above described problems and provides a printing system that adopts an SBC system in which a load at a server is alleviated when executing printing to enable printing to be performed smoothly, a print processing method, and a program.

In a first aspect of the present invention there is provided a printing system having a client terminal, a server, and an image forming apparatus that are connected to each other through a network, and that performs printing at the image forming apparatus based on data stored in the server in accordance with a print execution request from the client terminal, comprising a print execution requesting unit provided in the client terminal and adapted to specify data among stored data in the server, and send a print execution request to the server, a print-related information sending unit provided in the server and adapted to receive the print execution request sent by the print execution requesting unit, create print-related information relating to the specified data, and send the print-related information to the client terminal, a judging unit provided in the client terminal and adapted to receive the print-related information sent by the print-related information sending unit, and judge whether or not print data generation processing with respect to the specified data is possible at the client terminal based on the print-related information, a judgment result sending unit provided in the client terminal and adapted to send a judgment result obtained by the judging unit to the server, and an allocating unit provided in the server and adapted to allocate the print data generation processing with respect to the specified data to either the server or the client terminal based on the judgment result sent by the judgment result sending unit.

According to the present invention, in a printing system that adopts an SBC system, since print data generating processing can be performed at a client terminal, and not just at a server, the load at the server is alleviated when executing printing to enable printing to be performed smoothly.

Further, when performing print data generating processing for data that includes a plurality of kinds of data, processing is carried out by distributing the processing for creating the print data between the server and a client terminal. It is thereby possible to alleviate the load at the server and, at the same time, perform the print processing with good efficiency.

Further features and aspects of the present invention will become apparent from the following detailed description of exemplary embodiments with reference to the attached drawings.

DETAILED DESCRIPTION OF THE PREFERRED EMBODIMENTS

The following description of exemplary embodiments, features and aspects of the present invention is merely illustrative in nature and is in no way intended to limit the invention, its application, or uses.

First Embodiment

A printing system according to the first embodiment of the present invention is configured by an SBC system. In the printing system, a client terminal, an image forming apparatus, and a server are connected to each other through a network.

Figure 1:
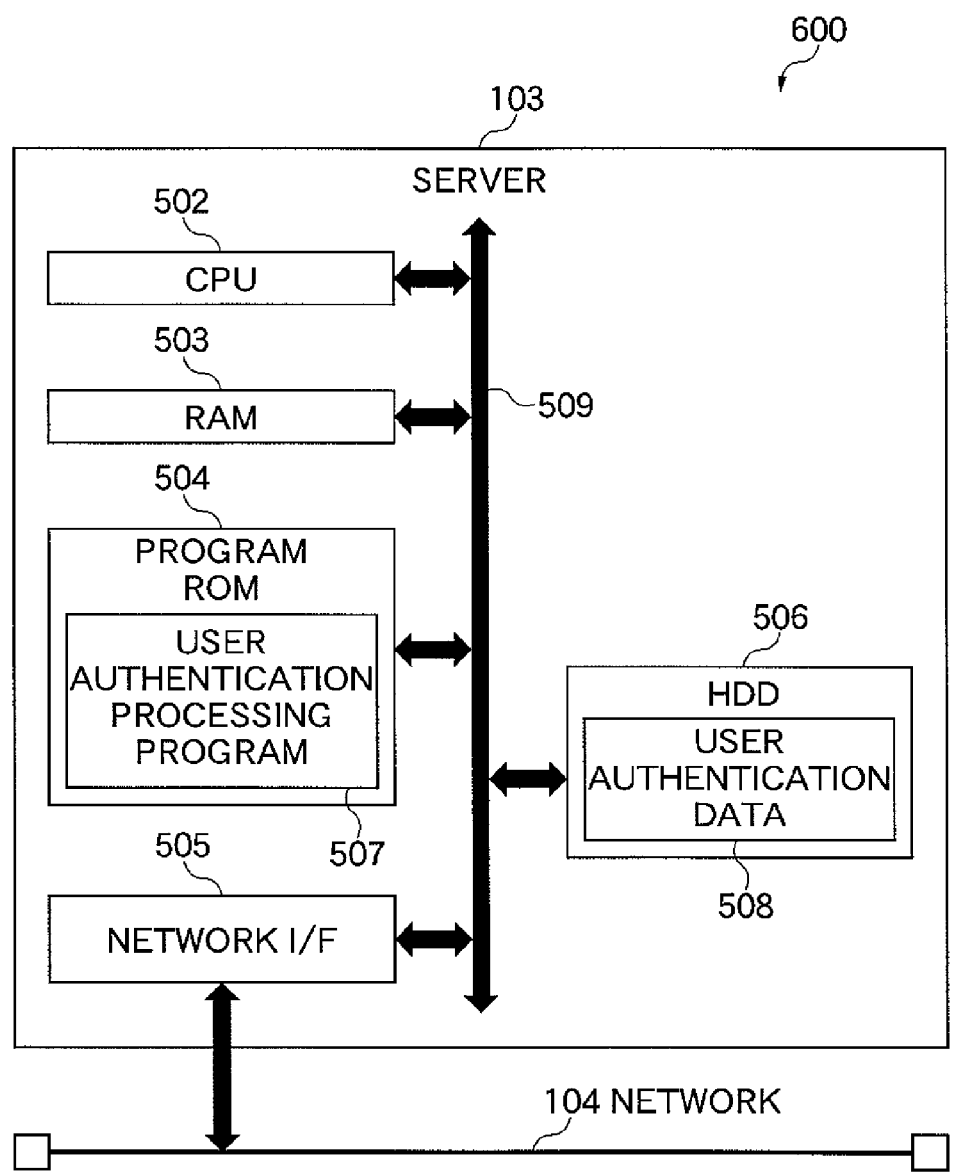
FIG. 1 is a block diagram showing the configuration of a server included in a printing system according to a first embodiment of the present invention.

FIG. 1 is a block diagram showing the configuration of a server included in the printing system according to the first embodiment of the present invention.

In FIG. 1, a server 103 is one of the components of a printing system 600 (see FIG. 6) that is connected to a network 104. The server 103 includes a CPU 502, a RAM 503, a program ROM 504, a network interface (I/F) 505, and a hard disk drive (HDD) 506, which are connected to each other by a system bus 509.

The program ROM 504 stores application programs (not shown) and a user authentication processing program 507 and the like. The user authentication processing program 507 is a program that decides whether to accept or deny a request to access the server 103 from a user that operates a client terminal 101 (see FIG. 3) that is described later. The RAM 503 functions as the main memory and work area and the like of the CPU 502. The HDD 506 stores user authentication data 508 in which users that can access the server 103 are registered.

The CPU 502 performs user authentication processing and various kinds of processing for documents and image data and the like based on the user authentication processing program 507 and application programs and the like that are stored on the program ROM 504. The documents are data in which graphics, images, characters, tables (including spreadsheets etc.) and the like are mixed. The CPU 502 also performs overall control of each device that is connected to the system bus 509.

An operating system program (hereunder, referred to as "OS") 601 (see FIG. 2), described later, that is the control program of the CPU 502 is stored in the program ROM 504 or the HDD 506.

The network I/F 505 is connected through the network 104 to an image forming apparatus 102 and a client terminal 101 (see FIG. 6) that are described later, and executes communication control processing.

Figure 2:
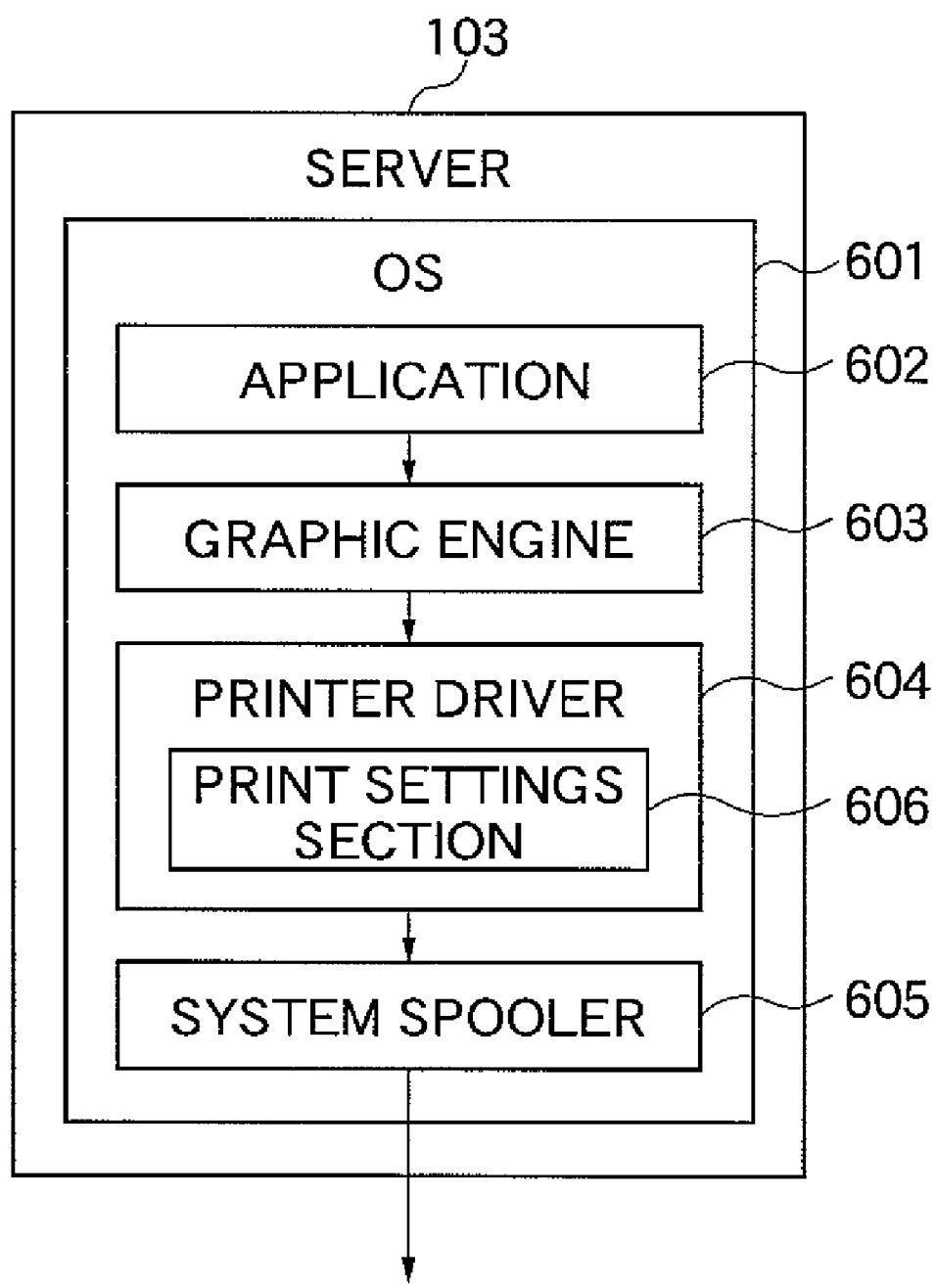
FIG. 2 is a block diagram showing the configuration of software the server illustrated in FIG. 1 uses when executing print processing.

FIG. 2 is a block diagram showing the configuration of software the server 103 shown in FIG. 1 uses when executing print processing.

In FIG. 2, in the server 103, an application 602, a graphic engine 603, a printer driver 604, and a system spooler 605 are stored as files on the HDD 506. These are program modules that are loaded in the RAM 503 and executed by the OS 601.

The application 602 and printer driver 604 are not stored on the HDD 506 from the beginning. Instead they can be added to the HDD 506 in accordance with the type of the image forming apparatus 102 (see FIG. 5) or the client terminal 101 (see FIG. 3) that is introduced into the printing system 600. The application 602 that is stored on the HDD 506 is loaded onto the RAM 503 and executed in accordance with the contents of a user input operation at the client terminal 101. When the aforementioned contents of the user input operation is a command to execute print processing, in order to perform printing, the graphic engine 603 is also loaded into the RAM 503 from the application 602 to the image forming apparatus 102 to perform output (rendering).

The graphic engine 603 loads the printer driver 604 that is added in accordance with the type of the image forming apparatus 102 into the RAM 503 from the HDD 506, and sets the application 602 to output to the printer driver 604. The graphic engine 603 also converts a GDI (Graphic Device Interface) function that is received from the application 602 into a DDI (Device Driver Interface) function, and outputs the DDI function to the printer driver 604. The printer driver 604 converts the DDI function received from the graphic engine 603 into a control command that is recognizable by the image forming apparatus 102, for example a PDL (Page Description Language) control command. The converted PDL control command passes through the network I/F 505 from the system spooler 605 that is loaded on the RAM 503 by the OS 601, and is output as print data to the image forming apparatus 102 via the network 104.

Figure 3:
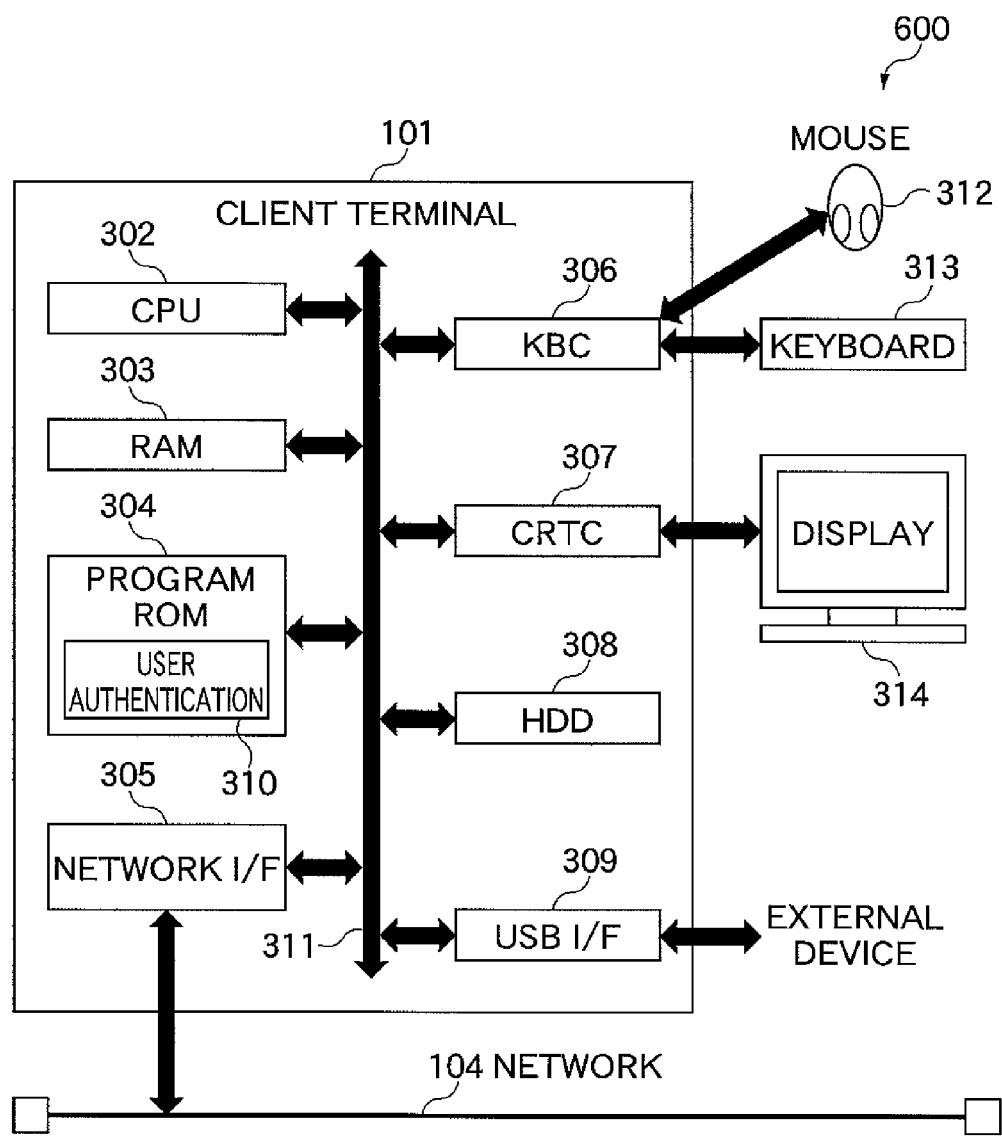
FIG. 3 is a block diagram showing the configuration of a client terminal that is included in the printing system according to the first embodiment of the present invention.

FIG. 3 is a block diagram showing the configuration of a client terminal that is included in the printing system 600 according to the first embodiment of the present invention.

In FIG. 3, the client terminal 101 is one of the components of the printing system 600 that is connected to the network 104. The client terminal 101 includes a CPU 302, a RAM 303, a program ROM 304, a network interface (I/F) 305, a keyboard controller (KBC) 306, a CRT controller (CRTC) 307, a hard disk drive (HDD) 308, and a USB interface (I/F) 309. These components are connected to each other by a system bus 311.

The program ROM 304 stores application programs (not shown) and a user authentication processing program 310 and the like. The user authentication processing program 310 is a program that requests access permission to the server 103 in response to an access request of a user that operates the client terminal 101 using a keyboard 313 or the like that is described later. The RAM 303 functions as the main memory and work area and the like of the CPU 302.

The CPU 302 performs user authentication processing and various kinds of processing for documents and image data and the like based on the user authentication processing program 310 and application programs and the like that are stored on the program ROM 304. The documents are data in which graphics, images, characters, tables (including spreadsheets etc.) and the like are mixed. The CPU 302 also performs overall control of each device that is connected to the system bus 311.

An operating system program (hereunder, referred to as "OS") 401 (see FIG. 4), described later, that is the control program of the CPU 302 is stored on the program ROM 304 or the HDD 308.

The network I/F 305 is connected through the network 104 to the image forming apparatus 102. The network I/F 305 executes a communication control processing.

The KBC 306 controls key input from a pointing device 312 such as the keyboard 313 or a mouse. The CRTC 307 performs display control for displaying an image that is sent from the server 103 on the CRT display 314.

The USB I/F 309 controls a communication processing for communicating with the image forming apparatus 102, and an access processing for accessing to an external device which stores user authentication data that is required when accessing the server 103.

Based on a command that is indicated by a mouse cursor displayed on the CRT display 314 or the like, the CPU 302 opens various windows that are previously registered on the CRT display 314 and executes various kinds of data processing. When executing printing, the user can open windows relating to the print settings to carry out setting of the image forming apparatus 102 and setting of the print processing method with respect to the printer driver, including selection of the print mode.

Figure 4:
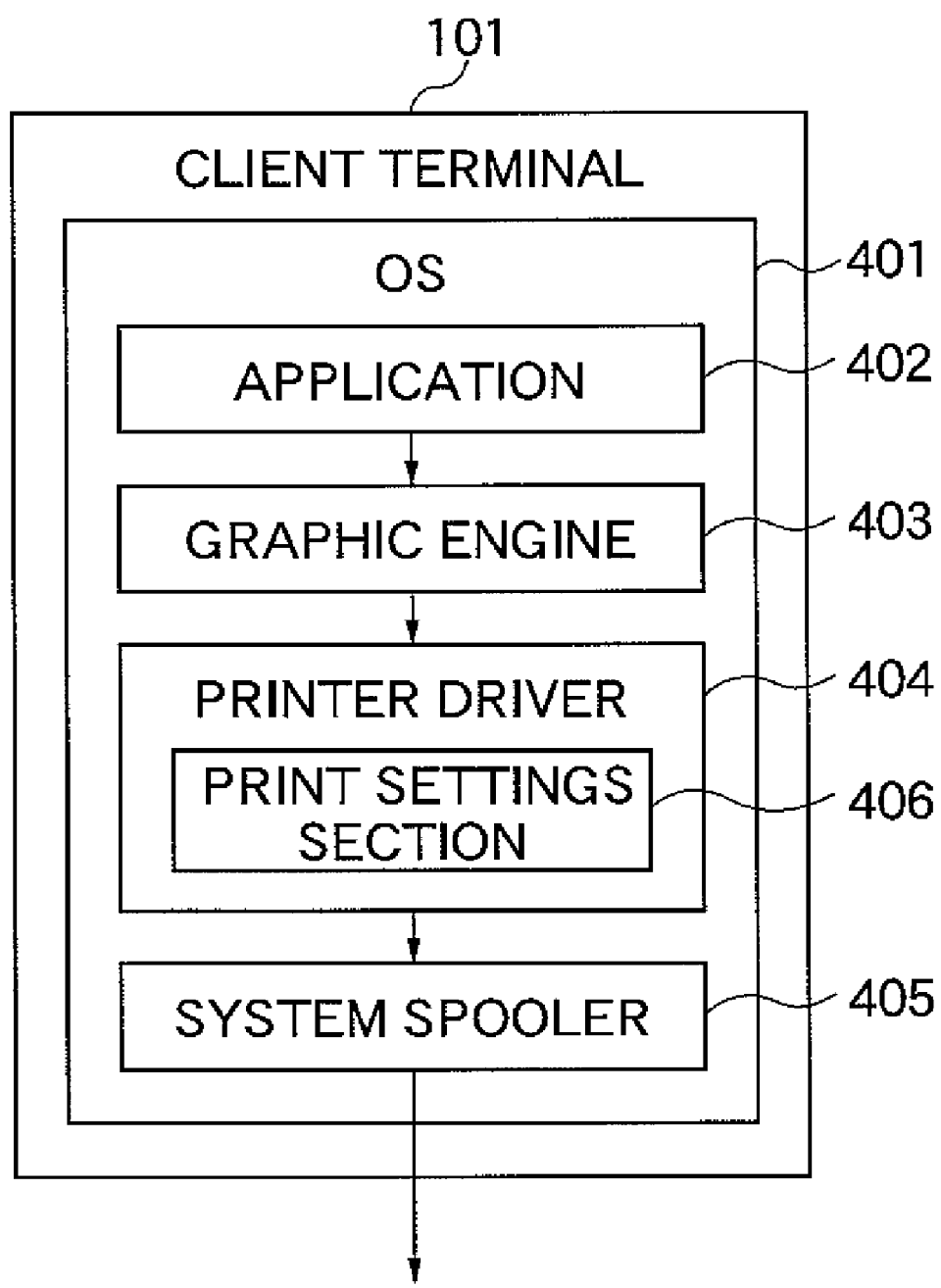
FIG. 4 is a block diagram showing the configuration of software the client terminal illustrated in FIG. 3 uses when executing print processing.

FIG. 4 is a block diagram showing the configuration of software the client terminal 101 illustrated in FIG. 3 uses when executing print processing.

In FIG. 4, in the client terminal 101, an application 402, a graphic engine 403, a printer driver 404, and a system spooler 405 are stored as files on the HDD 308. These are program modules that are loaded in the RAM 303 and executed by the OS 401.

The application 402 and printer driver 404 are not stored on the HDD 308 from the beginning. Instead, they can be added to the HDD 308 in accordance with the type of the server 103 and the image forming apparatus 102 that are introduced into the printing system 600. The application 402 that is stored on the HDD 308 is loaded onto the RAM 303 and executed in accordance with the contents of a user input operation performed using the keyboard 313 or the like. When the contents of the aforementioned user input operation is a command to execute print processing, in order to perform the image forming apparatus 102 to print, the application 402 also loads to the graphic engine 403 into the RAM 303 in a similar manner to perform the image forming apparatus 102 to output (rendering).

The graphic engine 403 loads the printer driver 404 that is added in accordance with the type of the image forming apparatus 102 into the RAM 303 from the HDD 308 to set the printer driver 404 as an output module from the application 402. The graphic engine 403 also converts a GDI (Graphic Device Interface) function that is received from the application 402 into a DDI (Device Driver Interface) function, and outputs the DDI function to the printer driver 404. The printer driver 404 converts the DDI function that is received from the graphic engine 403 into a control command that is recognizable by the image forming apparatus 102, for example a PDL (Page Description Language) control command. The converted PDL control command passes through the network I/F 305 from the system spooler 405 that is loaded to the RAM 303 by the OS 401, and is output as print data to the image forming apparatus 102 via the network 104.

Figure 5:
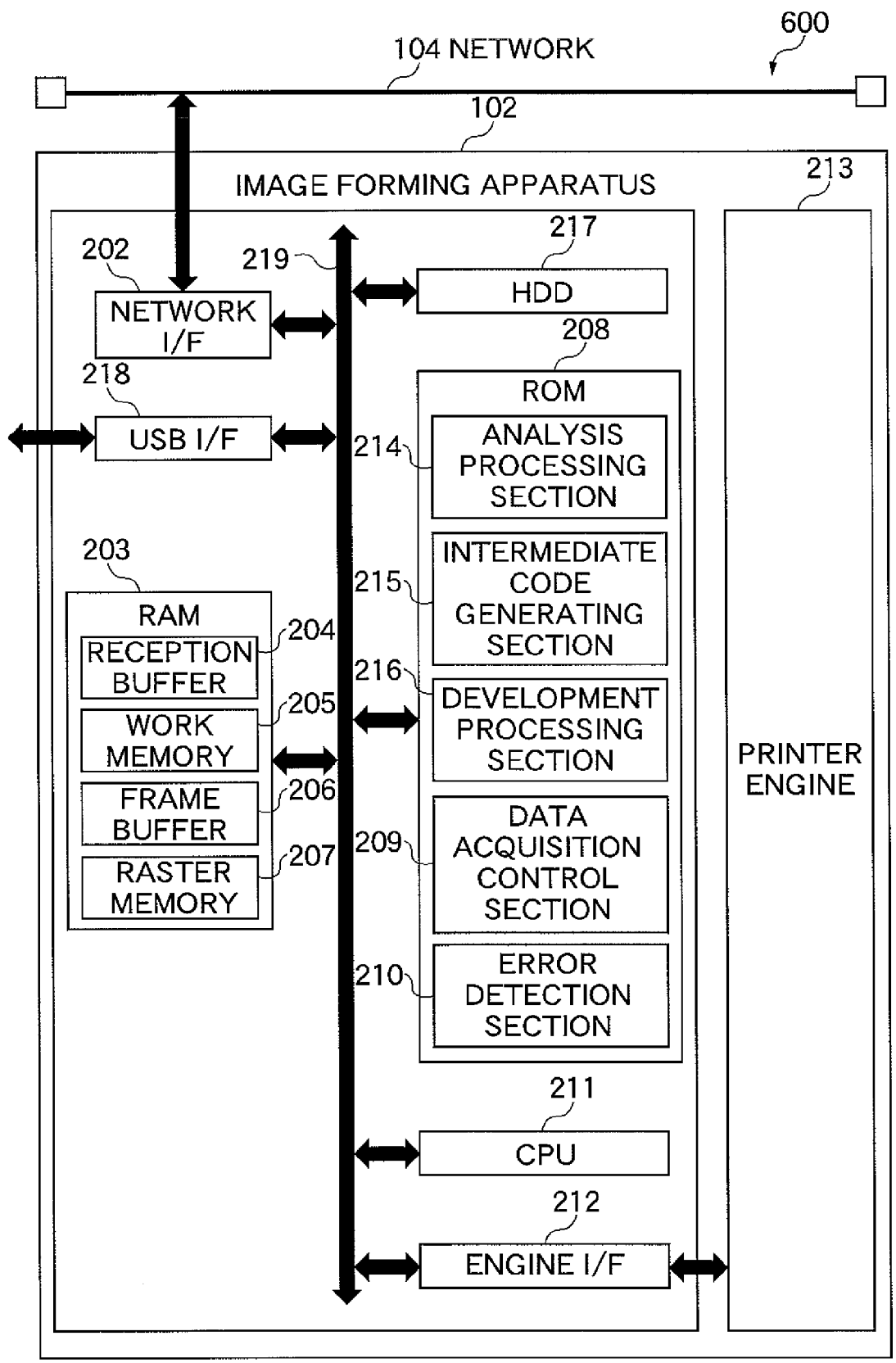
FIG. 5 is a block diagram showing the configuration of an image forming apparatus that is included in the printing system according to the first embodiment of the present invention.

FIG. 5 is a block diagram showing the configuration of an image forming apparatus that is included in the printing system 600 according to the first embodiment of the present invention.

In FIG. 5, the image forming apparatus 102 is one of the components of the printing system 600 (see FIG. 6) that is connected to the network 104. The image forming apparatus 102 includes a central processing unit (CPU) 211, a RAM 203, a ROM 208, a network interface (I/F) 202, an engine I/F 212, a hard disk drive (HDD) 217, a USB interface (I/F) 218, and a printer engine 213. These components are connected to each other by a system bus 219.

The network I/F 202 is connected to the server 103 and the client terminal 101 through the network 104. The network I/F 202 executes a communication control processing. In the present embodiment, the image forming apparatus 102 receives print data from the server 103 and the client terminal 101 through the network I/F 202.

The RAM 203 temporarily stores various information. The RAM 203 comprises a reception buffer 204, a work memory 205, a frame buffer 206, and a raster memory 207. The reception buffer 204 stores print data or image data that are sent from the server 103 or the client terminal 101. The work memory 205 is temporarily used when converting input data into an intermediate code. The frame buffer 206 stores an intermediate code and the like that is generated inside the image forming apparatus 102. The raster memory 207 stores data obtained by developing the intermediate code.

The ROM 208 stores a control program that is executed by the CPU 211. The functions that is executed by the control program include an analysis processing section 214, an intermediate code generating section 215, a development processing section 216, a data acquisition control section 209, and an error detection section 210. The analysis processing section 214 analyzes data that is read from the reception buffer 204 and allocates the data to the corresponding processing. The intermediate code generating section 215 generates intermediate data from data that is analyzed at the analysis processing section 214, and stores the intermediate data in the frame buffer 206. The development processing section 216 develops the intermediate code that is stored in the frame buffer 206 and stores the resulting data in the raster memory 207. The data acquisition control section 209 acquires data from external devices such as the server 103 through the network I/F 202. The error detection section 210 detects an error that occurs at the image forming apparatus 102, and notifies the server 103 or the client terminal 101 through the network I/F 202 or the USB I/F 218.

The CPU 211 performs arithmetic processing or controlling in the image forming apparatus 102. The engine I/F 212 performs input and output of signals with respect to the printer engine 213. The printer engine 213 performs processing for a series of electrophotographic processes based on image data, such as forming a latent image on a photosensitive drum, transferring an image onto a sheet, and fixing the image.

Figure 6:
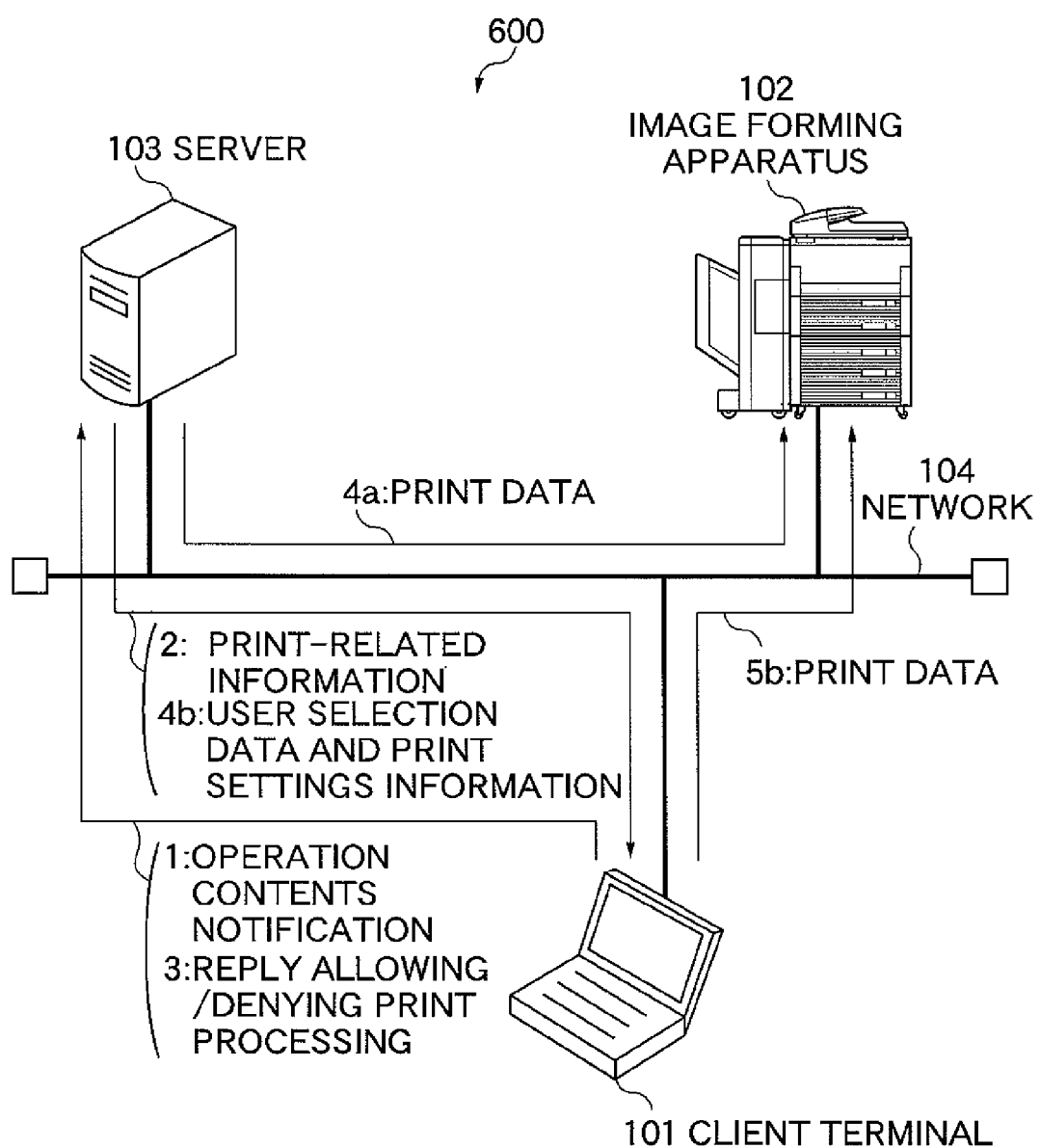
FIG. 6 is a block diagram showing the overall configuration of the printing system according to the first embodiment of the present invention.

FIG. 6 is a block diagram showing the overall configuration of the printing system 600 according to the first embodiment of the present invention.

In FIG. 6, in the printing system 600, the server 103, the client terminal 101, and the image forming apparatus 102 are connected to each other through the network 104. From the client terminal 101 to the server 103 is sent, through the network 104, information such as an operation contents notification 1 that comprises a print execution notification for documents or image data that are selected by a user (hereunder, referred to as "user selection data") or a reply allowing/denying print processing 3. From the server 103 to the client terminal 101 is sent, through the network 104, print-related information 2 and user selection data and print settings information 4b. In this case, the term "print-related information 2" refers to information comprising application identification information, print settings information, and information regarding the data amount of user selection data and the like. Print data 4a and 5b are sent from the server 103 and the client terminal 101 to the image forming apparatus 102 through the network 104.

In this connection, the printing system according to the first embodiment of the present invention may have a different network configuration to the printing system 600 illustrated in FIG. 6. This different configuration is shown in FIG. 7.

Figure 7:
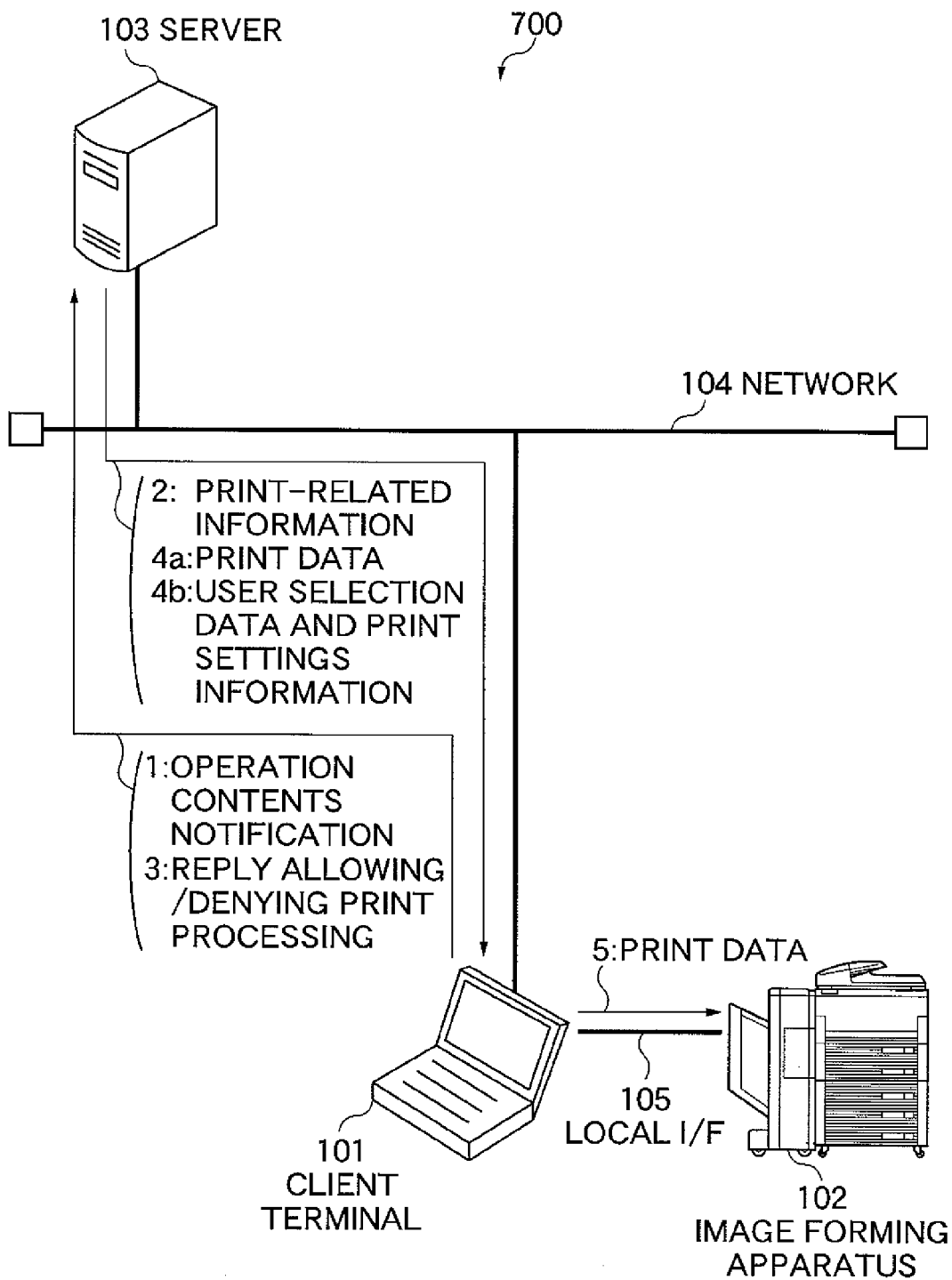
FIG. 7 is a block diagram showing a variation of the overall configuration of the printing system illustrated in FIG. 6.

FIG. 7 is a block diagram showing a variation of the overall configuration of the printing system 600 illustrated in FIG. 6.

In FIG. 7, in a printing system 700, the server 103 and the client terminal 101 are connected to each other through the network 104. The image forming apparatus 102 is connected to the client terminal 101 through a local I/F 105 configured by a USB or a Centronics interface or the like. The print-related information 2, the user selection data and print settings information 4b, and the print data 4a and the like are sent from the server 103 to the client terminal 101 through the network 104. Information such as the operation contents notification 1 and the reply allowing/denying print processing 3 are sent from the client terminal 101 to the server 103 through the network 104. That is, according to the variation, the print data 5b that is sent from the server 103 to the image forming apparatus 102 includes print data that is generated on the client terminal 101 and print data that is generated on the server 103 and sent through the client terminal 101 and the local I/F 105.

Figure 8:
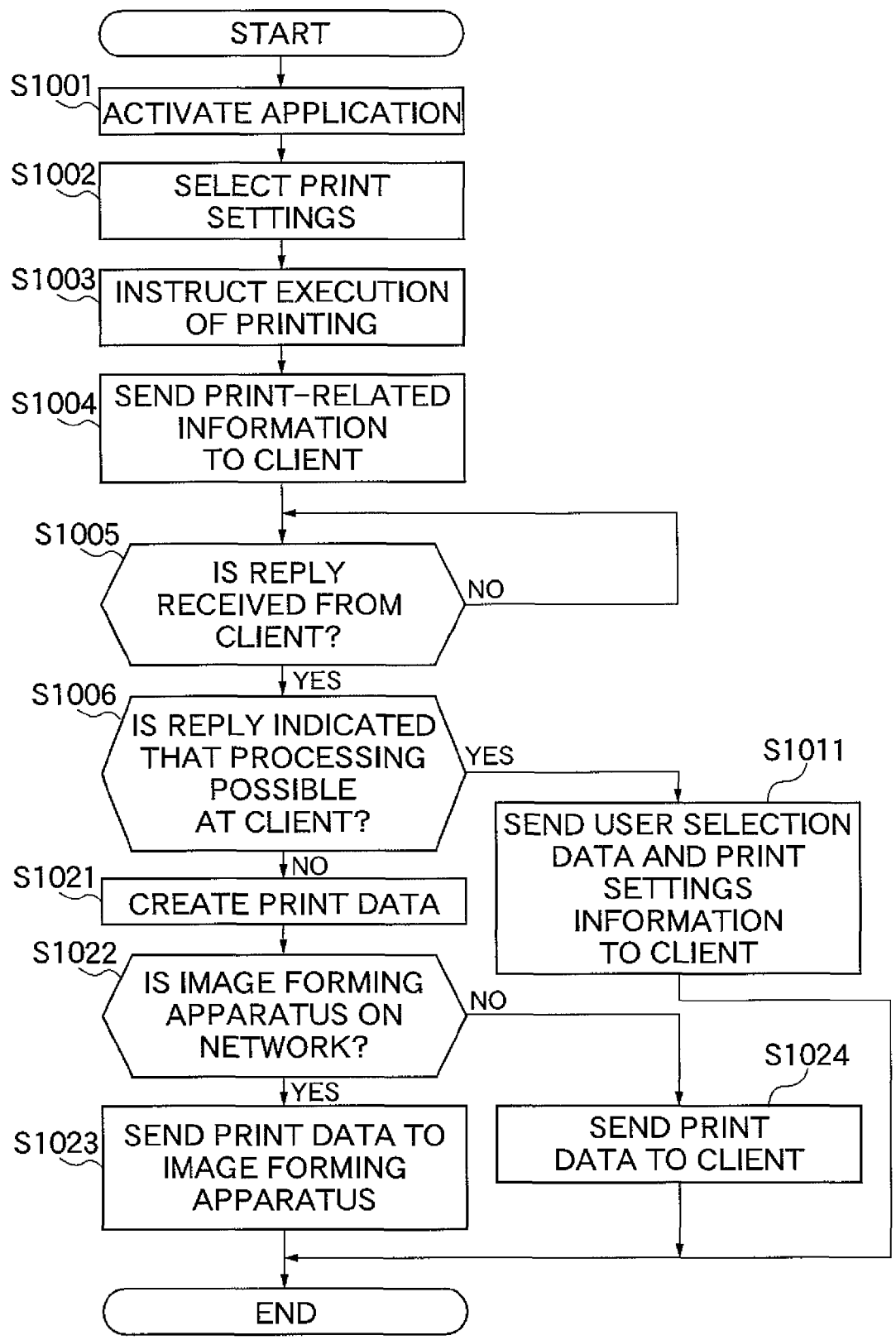
FIG. 8 is a flowchart showing the procedure of print processing that is executed at the server.

FIG. 8 is a flowchart illustrating the procedure of print processing that is executed at the server 103. This print processing can be applied whether the printing system in which the server 103 is introduced is the printing system 600 or the printing system 700.

In FIG. 8, first, documents or image data are selected by an input operation by the user at the client terminal 101 using the keyboard 313 or the like, and next, when the user performs an input operation to instruct printing of the selected documents or the like, the client terminal 101 sends a print execution notification as the operation contents notification 1 to the server 103. When the server 103 receives the operation contents notification 1, the application 602 is activated on the server 103 (step S1001). Thereafter, print settings are selected (step S1002) and execution of printing is also instructed (step S1003) by the application 602. When this print execution instruction is made, the server 103 sends the print-related information 2 to the client terminal 101 (step S1004) Thereafter, the server 103 waits for the reply allowing/denying print processing 3 that concerns the print-related information 2 that has been sent, to be sent from the client terminal 101.

When the reply allowing/denying print processing 3 is sent from the client terminal 101 (YES at step S1005), the server 103 determines whether that reply allowing/denying print processing 3 is a reply to the effect that print processing can be performed at the client terminal 101 (step S1006). When the reply is one allowing print processing (YES at step S1006), the server 103 sends the user selection data and print settings information 4b to the client terminal 101 (step S1011). In contrast, when the reply is one denying print processing (NO at step S1006), the server 103 creates the print data 4a in accordance with the print settings (step S1021).

Next, the server 103 determines whether or not the image forming apparatus 102 at which printing should be performed is present on the network 104 (step S1022). When it is determined that the image forming apparatus 102 is present on the network 104 (case shown in FIG. 6), the server 103 sends the print data 4a to the image forming apparatus 102 (step S1023). In contrast, when it is determined that the image forming apparatus 102 is not connected on the network 104 and is connected through the local I/F 105 to the client terminal 101 (case of FIG. 7), the server 103 sends the print data 4a to the client terminal 101 (step S1024).

Figure 9:
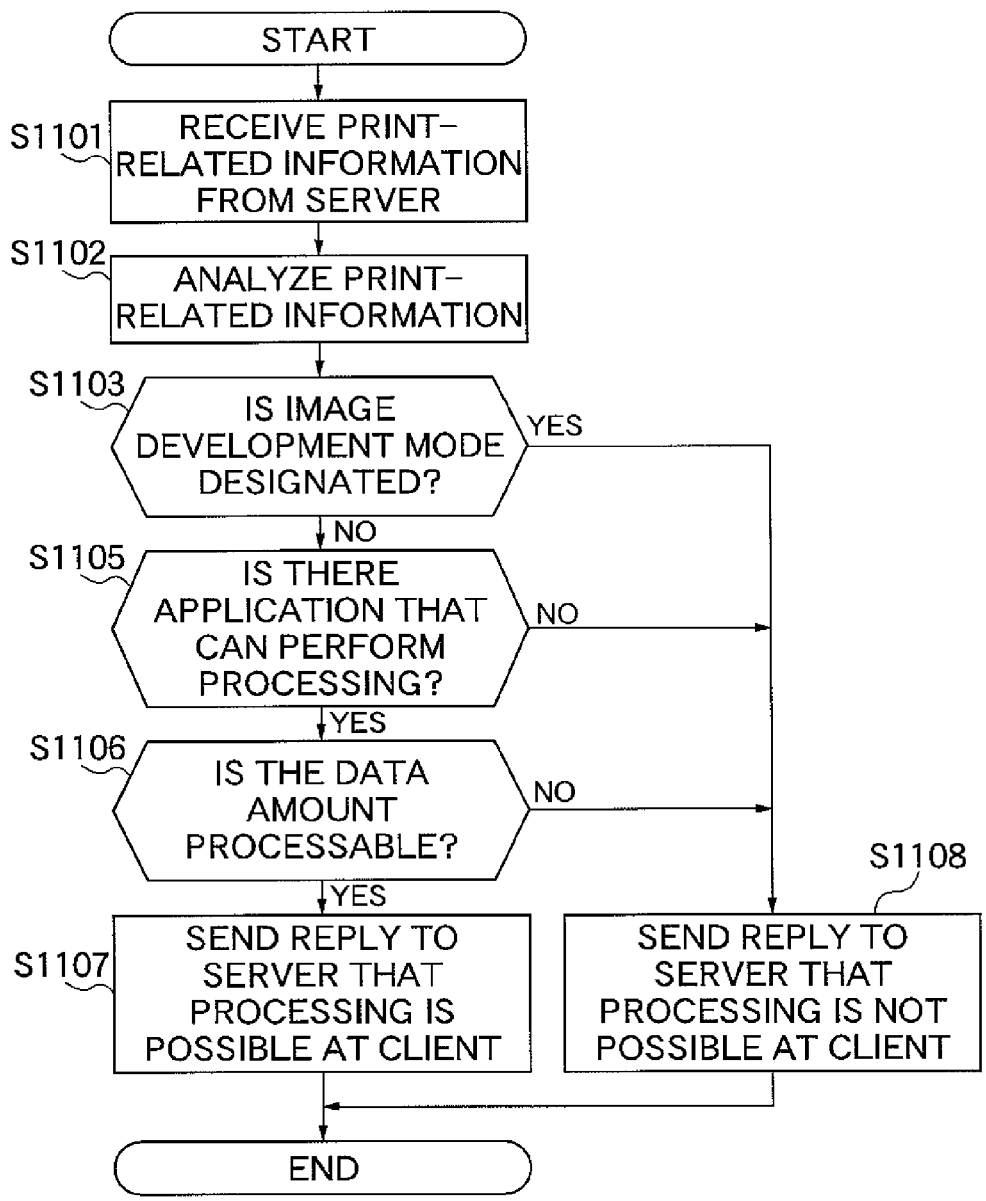
FIG. 9 is a flowchart showing the procedure of processing for a reply allowing/denying print processing that is performed at the client terminal.

FIG. 9 is a flowchart showing the procedure of processing for the reply allowing/denying print processing that is performed at the client terminal 101. This print processing can be applied whether the printing system in which the server 103 is introduced is the printing system 600 or the printing system 700.

In FIG. 9, first, when the print-related information 2 that is sent through the network 104 from the server 103 at step S1004 in FIG. 8 is received by the network I/F 305 of the client terminal 101 (step S1101), the client terminal 101 analyzes the contents of the print-related information 2 (step S1102). Thereafter, the client terminal 101 determines whether or not an image development mode is designated in print settings information included in the print-related information 2 that is analyzed (step S1103). Further, using the application identification information included in the print-related information 2 that is analyzed, the client terminal 101 determines whether or not an application required for print processing of the user selection data is present at the client terminal 101 (step S1105). The client terminal 101 also determines whether or not the data amount of the user selection data included in the print-related information 2 that is analyzed is a data amount for which print processing can be performed at the client terminal 101 (step S1106).

If the determination at step S1103 is negative (NO), the determination at step S1105 is affirmative (YES), and the determination at step S1106 is affirmative (YES), the process proceeds to step S1107. In contrast, if the determination at step S1103 is affirmative (Yes), the determination at step S1105 is negative (NO), and the determination at step S1106 is negative (NO), the process proceeds to step S1108. In this connection, when the processing is that in which the determination at step S1103 is negative (NO), the determination at step S1105 is affirmative (YES), and the determination at step S1106 is affirmative (YES) such that the process proceeds to step S1107, the order of determining at steps S1103, S1105, and S1106 is not limited to the order according to the present embodiment, and may be an arbitrary order.

At step S1107, the client terminal 101 sends a reply allowing/denying print processing 3 to the effect that print processing is possible to the server 103 through the network I/F 305 and the network 104.

In contrast, at step S1108, the client terminal 101 sends a reply allowing/denying print processing 3 to the effect that print processing is not possible to the server 103 through the network I/F 305 and the network 104.

Figure 10:
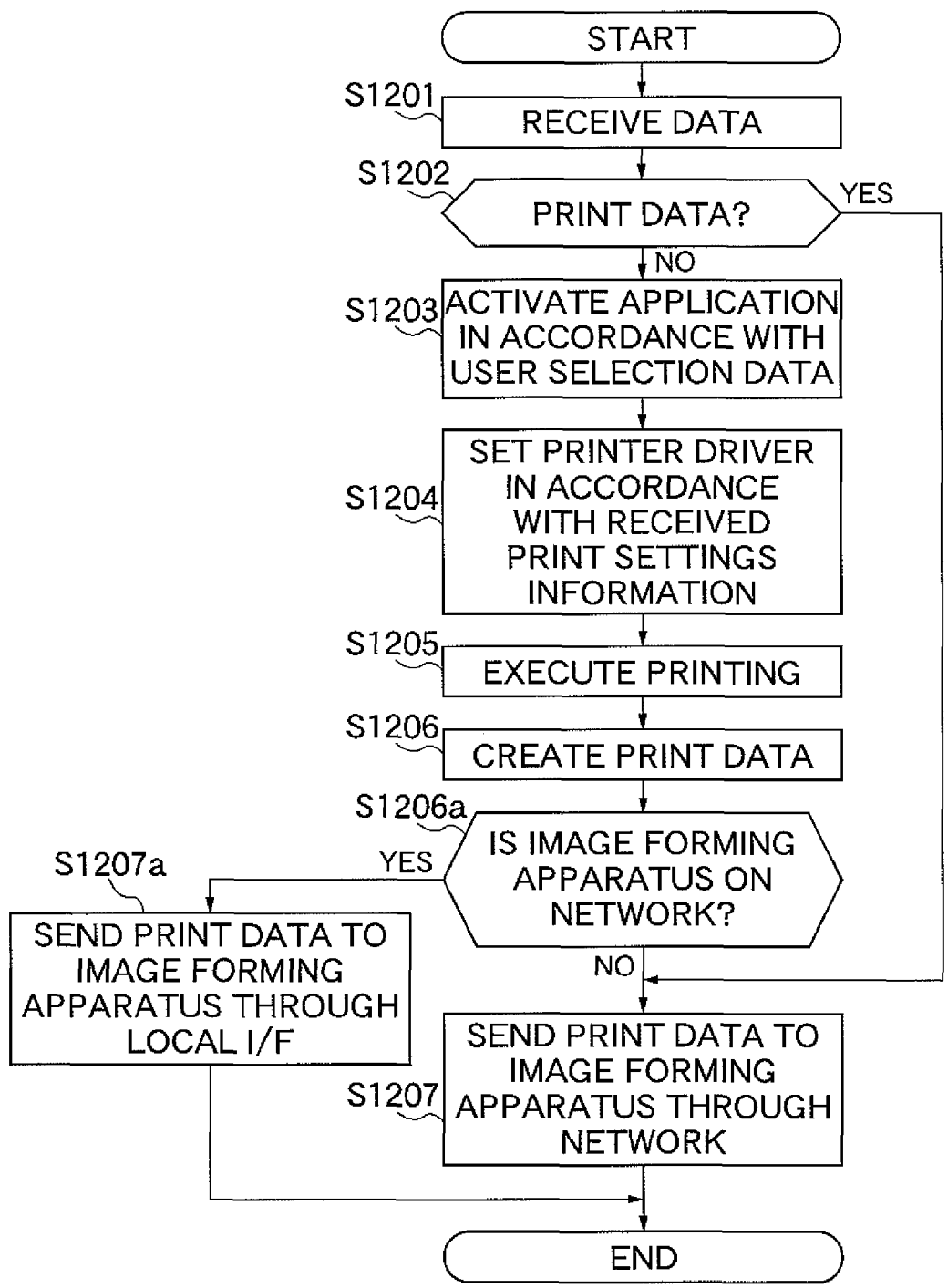
FIG. 10 is a flowchart showing the procedure of print data creation processing performed at the client terminal.

FIG. 10 is a flowchart showing the procedure of print data creation processing performed at the client terminal 101. This print processing can be applied whether the printing system in which the server 103 is introduced is the printing system 600 or the printing system 700.

In FIG. 10, first, when the client terminal 101 receives with the network I/F 305 data that is sent from the server 103 through the network 104 (step S1201), the client terminal 101 determines whether or not the received data is print data (step S1202). If it is determined as a result that the received data is the print data 4a that is sent from the server 103 by the processing at step S1024 in FIG. 8 (when the printing system is the printing system 700 illustrated in FIG. 7), the process proceeds to step S1207. In contrast, if it is determined that the received data is not print data, and is the user selection data and print settings information 4b that is sent from the server 103 by the processing at step S1011 in FIG. 8, the process proceeds to step S1203.

At step S1207, as shown in FIG. 7, the client terminal 101 sends the print data that is generated at the server 103 to the image forming apparatus 102 through the local I/F 105, as print data 5 (see FIG. 7).

Meanwhile, at step S1203, the client terminal 101 activates an application in accordance with the user selection data (step S1203), and sets the printer driver in accordance with the print settings information that is simultaneously sent from the server 103 with the user selection data (step S1204). The client terminal 101 then executes the print processing (step S1205), and creates print data (step S1206). Thereafter, the client terminal 101 determines whether or not the image forming apparatus 102 at which printing should be performed is present on the network 104 (step S1206a). When it is determined that the image forming apparatus 102 is present on the network 104 (case shown in FIG. 6), the client terminal 101 sends the print data that is created on the client terminal 101 at step S1206 to the image forming apparatus 102 through the network 104 as the print data 5b (step S1207). In contrast, when the result determined at step S1206a indicates that the image forming apparatus 102 is not connected on the network 104 and is connected through the local I/F 105 to the client terminal 101 (case of FIG. 7), the client terminal 101 sends the print data that is created on the client terminal 101 at step S1206 to the image forming apparatus 102 through the local I/F 105 as the print data 5 (step S1207a).

Figure 11:
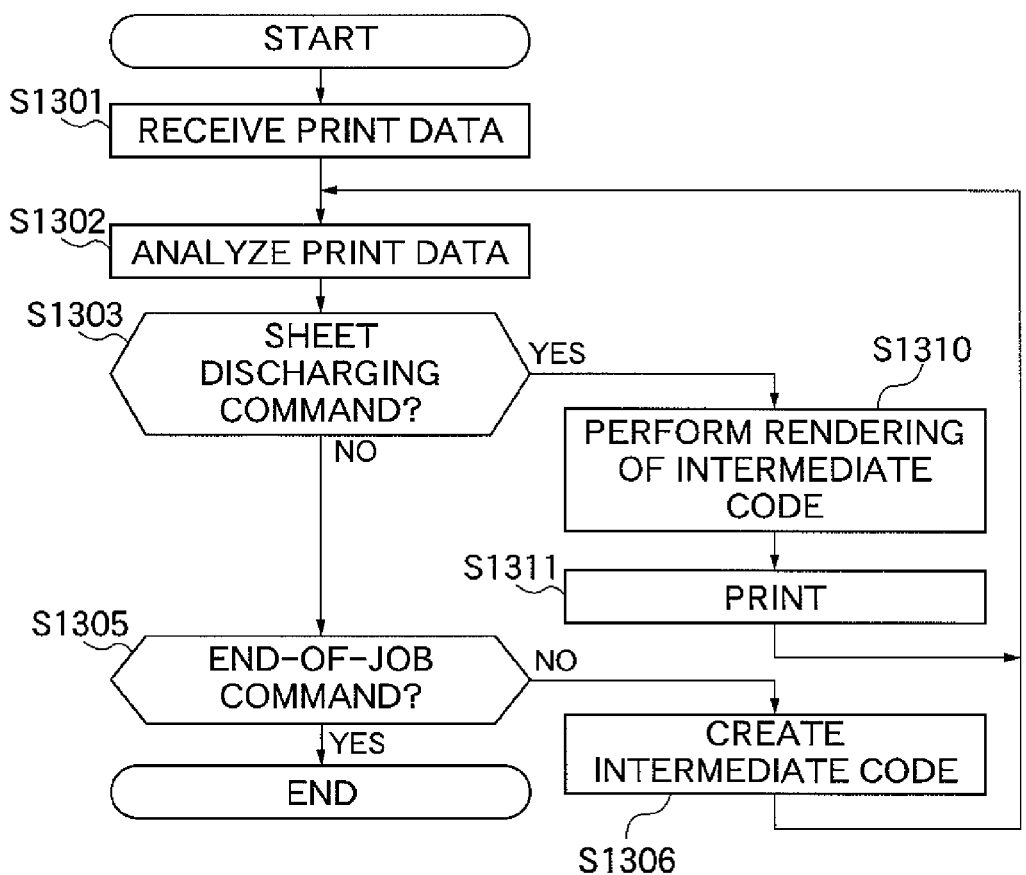
FIG. 11 is a flowchart showing the procedure of print processing that is executed at the image forming apparatus.

FIG. 11 is a flowchart showing the procedure of print processing that is executed at the image forming apparatus 102. This print processing can be applied whether the printing system in which the server 103 is introduced is the printing system 600 or the printing system 700.

In FIG. 11, first, upon receiving print data (4a, 5b, 5) through the network 104 or the local I/F 105 (step S1301), the image forming apparatus 102 stores the received print data in the reception buffer 204. Concurrently with reception of the print data, the image forming apparatus 102 reads out the print data that is stored in the reception buffer 204 and analyzes the print data (step S1302). The image forming apparatus 102 determines whether or not a command obtained by analyzing the print data is a sheet discharging command (step S1303). If it is determined as a result that the command is a sheet discharging command, the process proceeds to step S1310. If it is determined that the command is not a sheet discharging command, the process proceeds to step S1305.

At step S1305, the image forming apparatus 102 determines whether or not a command obtained by analyzing the print data is an end-of-job command (step S1305). When it is determined that the command is an end-of-job command, the present print processing is terminated. In contrast, when it is determined that the command is not an end-of-job command, the process proceeds to step S1306.

At step S1306, the image forming apparatus 102 creates an intermediate code, stores the intermediate code in the frame buffer 206, and returns to step S1302.

On the other hand, at step S1310 the image forming apparatus 102 performs rendering for the intermediate code that is stored in the frame buffer 206, and stores a developed image that is obtained in the raster memory 207. In the next step S1311, the image forming apparatus 102 transfers the developed image that is stored in the raster memory 207 to the printer engine 213 through the engine I/F 212 to cause the printer engine 213 to perform printing. The process then returns to step S1302.

Thus, according to the first embodiment of the present invention, the load of the server 103 is reduced at the time of print execution, enabling printing to be smoothly performed.

Although in the above description the client terminal 101 determines whether or not it is possible to perform print processing at the client terminal 101, a configuration may also be adopted in which the server 103 determines whether or not print processing is possible at the client terminal 101. Further, although a configuration is adopted above in which a decision as to whether print processing can be performed at the client terminal 101 is made on the basis of whether or not the image development mode is designated as print settings information, whether or not the client terminal 101 has an required for print processing of the user selection data, and whether or not the data amount can be processed at the client terminal 101, the present invention is not limited thereto, and a configuration may be adopted in which a decision is made based on various conditions such as whether or not an image data is included in the user selection data.

Second Embodiment

Next, a second embodiment of the present invention will be described.

The system configuration of the second embodiment of the present invention is fundamentally the same as the configuration of the first embodiment of the present invention. Therefore, an explanation on different points therebetween will be given below, with explanations on structural elements denoted by the same reference numerals omitted.

Although in the first embodiment of the present invention print processing is performed at either the server 103 or the client terminal 101, in the second embodiment of the present invention both the server 103 and the client terminal 101 operate in conjunction to perform print processing.

Figure 12:
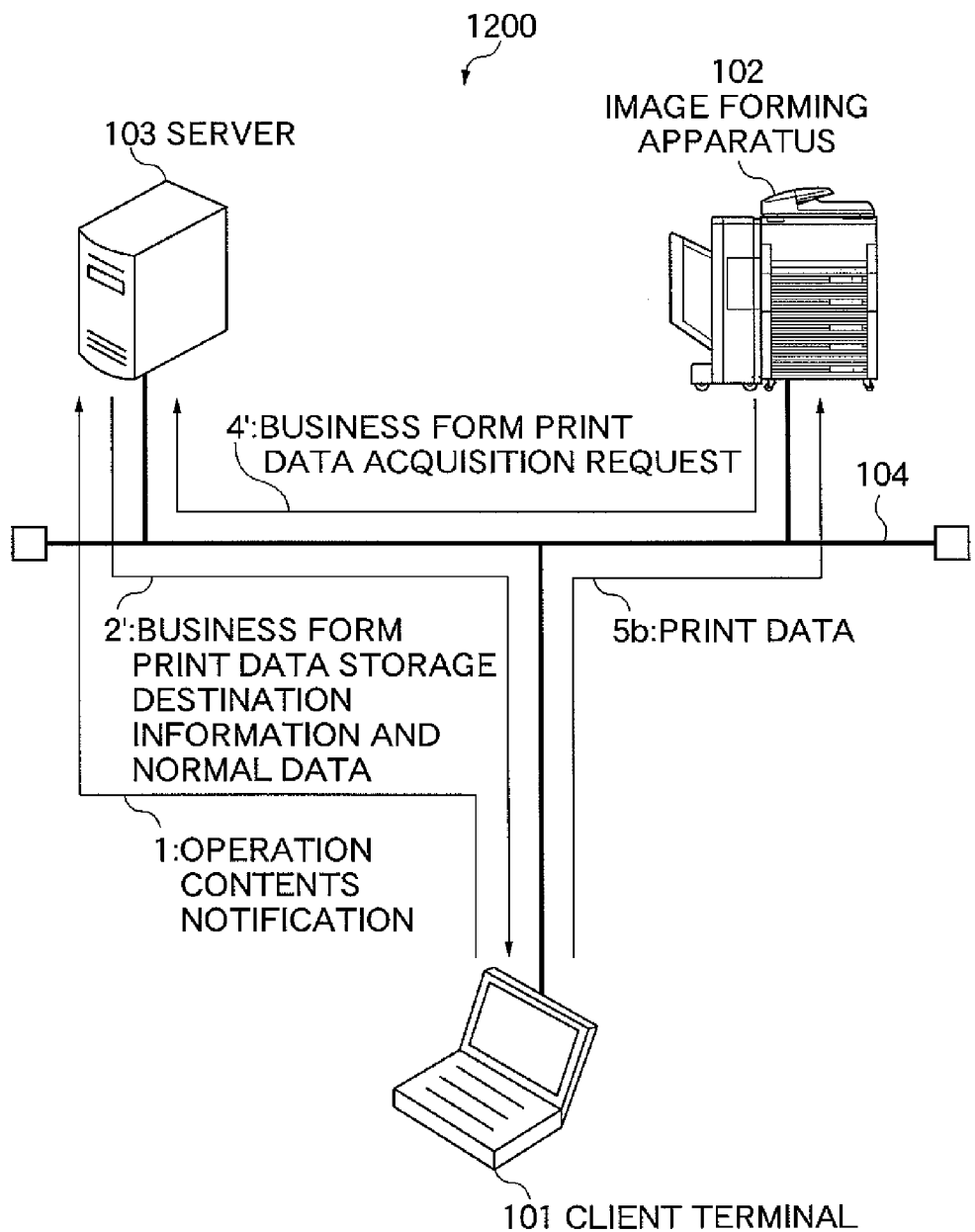
FIG. 12 is a block diagram showing the overall configuration of a printing system according to a second embodiment of the present invention.

FIG. 12 is a block diagram showing the overall configuration of a printing system according to the second embodiment of the present invention. The configuration of this printing system according to the second embodiment corresponds to the network configuration of the printing system 600 shown in FIG. 6.

In FIG. 12, in a printing system 1200, the server 103, the client terminal 101, and the image forming apparatus 102 are connected to each other through the network 104.

Business form print data (data such as frames for business form printing) storage destination information and normal data (data other than a business form portion among user selection data, and the print settings information thereof) 2' is sent from the server 103 to the client terminal 101 through the network 104. The business form print data storage destination information includes information showing a location at which the business form print data is stored and information that specifies the business form print data. For example, the information is represented by a URL (Uniform Resource Locator) or the like. The operation contents notification 1 or the like is sent from the client terminal 101 to the server 103 through the network 104. Further, the print data 5b is sent to the image forming apparatus 102 from the client terminal 101 through the network 104. A business form print data acquisition request 4' is sent from the image forming apparatus 102 to the server 103 through the network 104.

Figure 13:
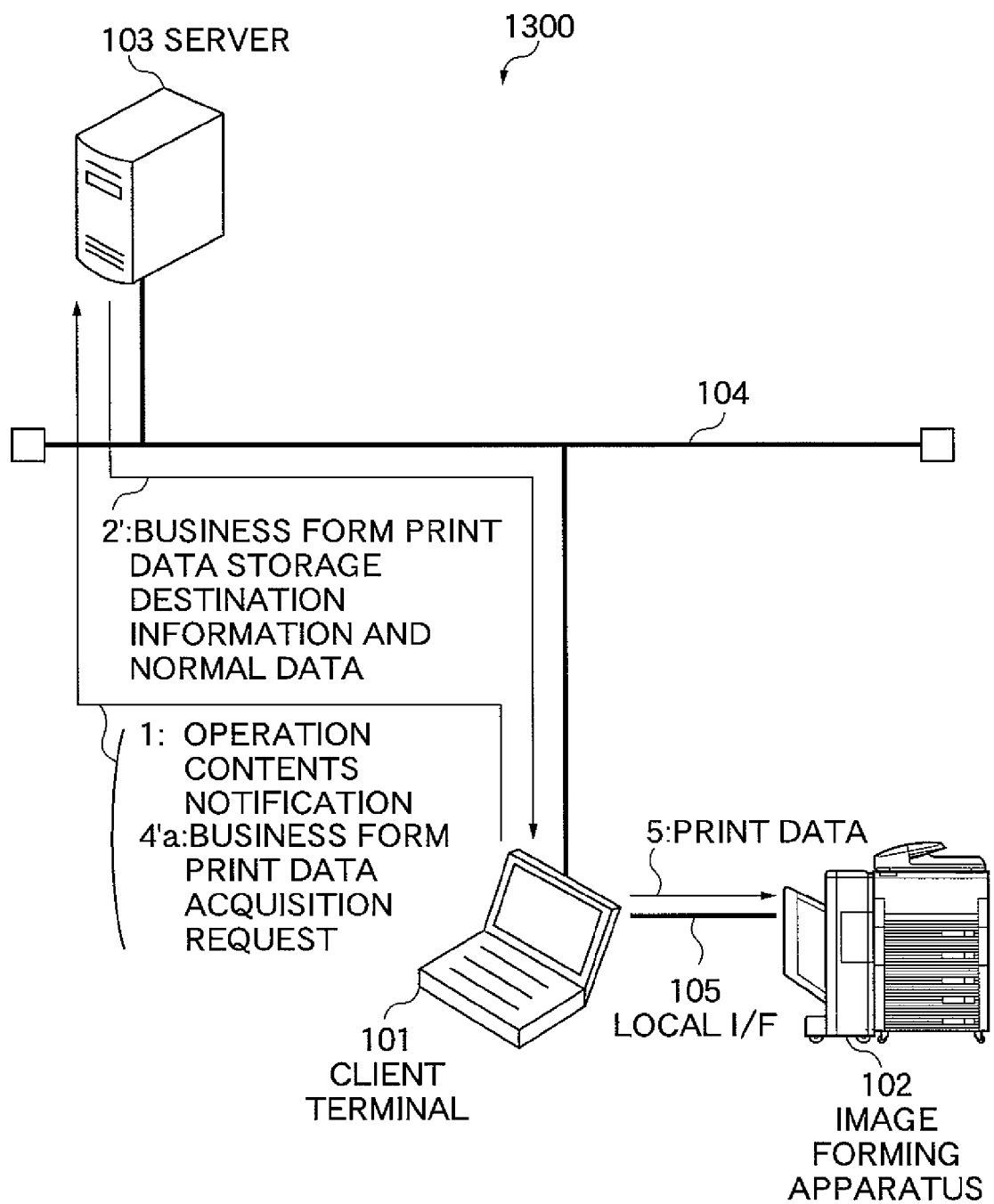
FIG. 13 is a block diagram showing a variation of the overall configuration of the printing system illustrated in FIG. 12.

FIG. 13 is a block diagram showing a variation of the overall configuration of the printing system 1200 illustrated in FIG. 12. The configuration of the printing system according to this modification example corresponds to the network configuration of the printing system 700 illustrated in FIG. 7.

In FIG. 13, in a printing system 1300, the server 103 and the client terminal 101 are connected to each other through the network 104, and the image forming apparatus 102 is connected to the client terminal 101 through the local I/F 105.

Business form print data storage destination information, normal data and the like are sent from the server 103 to the client terminal 101 through the network 104. The operation contents notification 1, a business form print data acquisition request 4'a and the like are sent from the client terminal 101 to the server 103 through the network 104. Further, the print data 5 is sent from the client terminal 101 to the image forming apparatus 102 through the local I/F 105.

Figure 14:
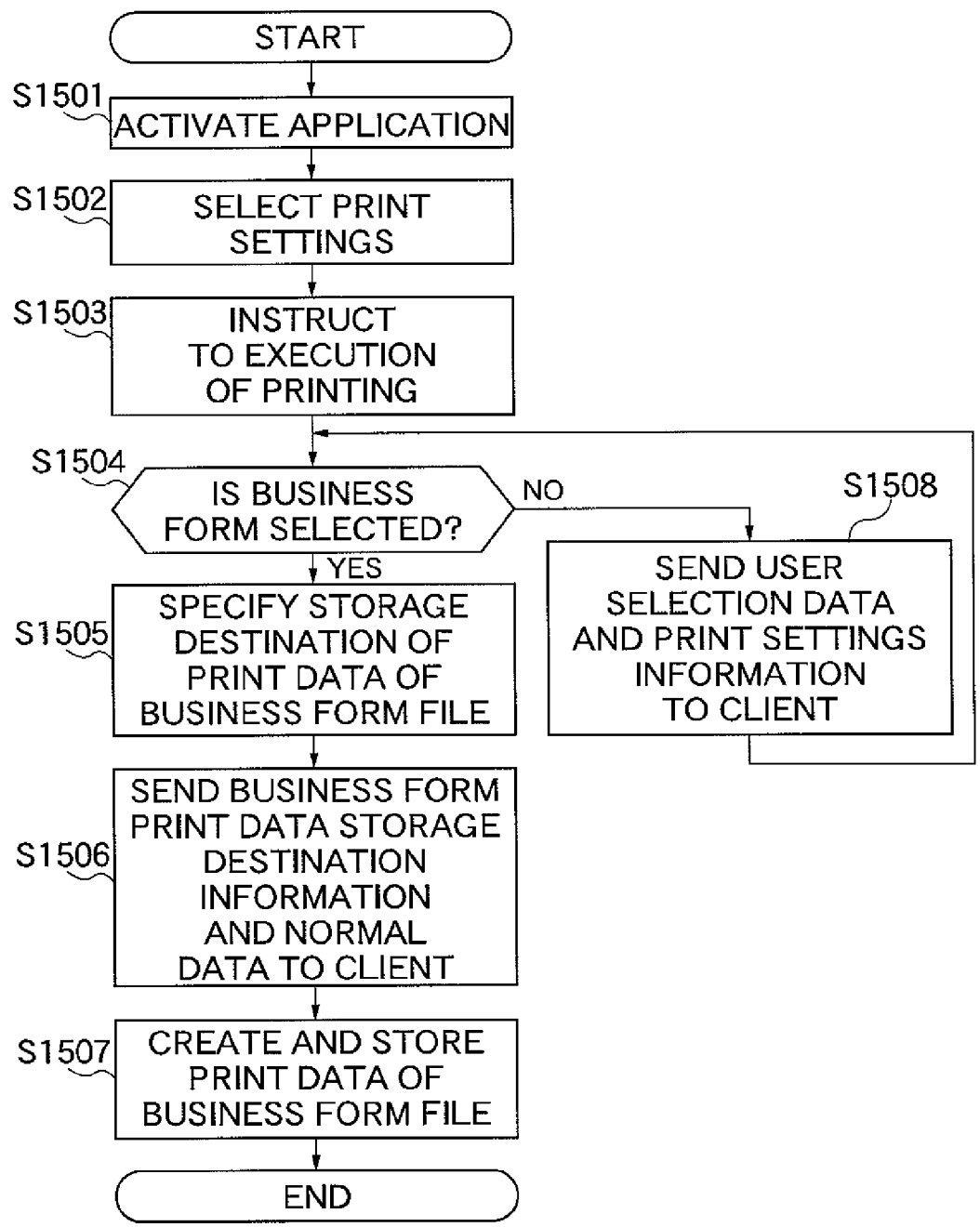
FIG. 14 is a flowchart showing the procedure of print processing that is executed at the server in the printing system according to the second embodiment.

FIG. 14 is a flowchart showing the procedure of print processing that is executed at the server 103 in the printing system according to the second embodiment. This print processing can be applied whether the printing system in which the server 103 is introduced is the printing system 1200 or the printing system 1300.

In FIG. 14, first, document or image data is selected by an input operation by the user at the client terminal 101 using the keyboard 313 or the like. Next, when the user performs an input operation to instruct printing of the selected document or the like, the client terminal 101 sends a print execution notification as the operation contents notification 1 to the server 103. When the server 103 receives the operation contents notification 1, the application 602 is activated on the server 103 (step S1501). Thereafter, print settings are selected (step S1502) and execution of printing is also instructed (step S1503) by the application 602.

When this print execution instruction is made, the server 103 determines whether or not a business form is selected in the print settings that are set (step S1504). When it is determined that a business form is selected the process proceeds to step S1505. If it is determined that a business form is not selected, the process proceeds to step S1508.

At step S1505, the storage location of print data of a business form file to be created at step S1507, described later, is designated inside the server 103, and the storage location information is employed as business form print data storage destination information. The server 103 then sends the business form print data storage destination information and normal data 2' to the client terminal 101 through the network 104 (step S1506). Next, the server 103 creates print data of a business form file and stores the print data based on the business form print data storage destination information that is notified to the client terminal 101 (step S1507).

In contrast, at step S1508 the server 103 sends the user selection data and print settings information 4b to the client terminal 101 through the network 104 (step S1508).

Next, processing to send print data of a business form file that is performed at the server 103 when the business form print data acquisition request 4' or 4'a that requests sending of print data of a business form file that is held by the server 103 is sent to the server 103 from the image forming apparatus 102 or the client terminal 101 is described. The print data of a business form file is the data that is stored in the server 103 at step S1507.

Figure 15:
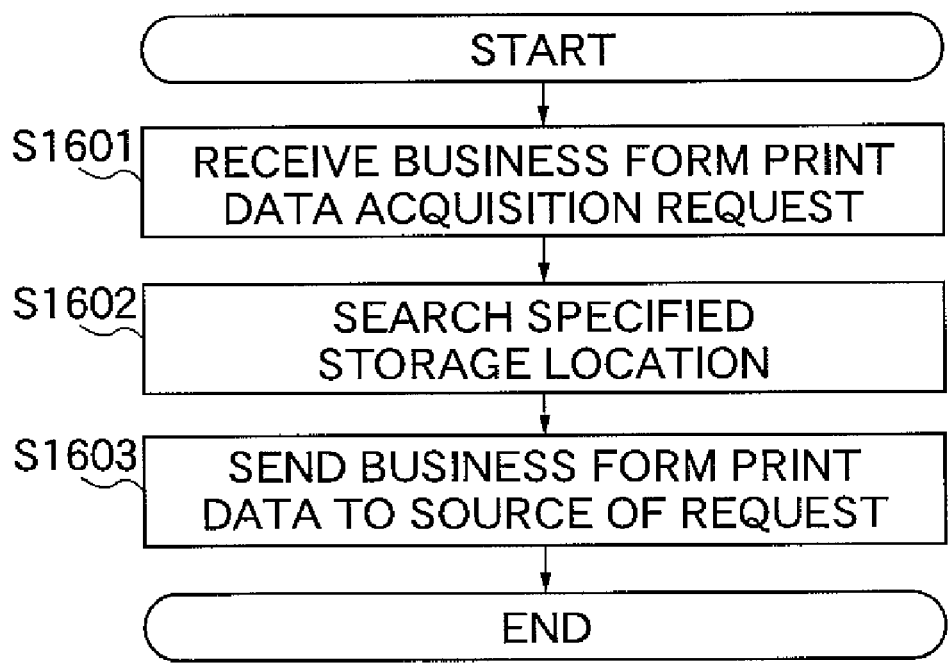
FIG. 15 is a flowchart showing the procedure of a processing to send print data that the server performs when a print data acquisition request is received.

FIG. 15 is a flowchart showing the procedure of a processing to send print data that the server 103 performs when the print data acquisition request 4' or 4'a is received. This processing to send print data can be applied whether the printing system in which the server 103 is introduced is the printing system 1200 or the printing system 1300.

In FIG. 15, when the server 103 receives the business form print data acquisition request 4'a (4') from the image forming apparatus 102 (or the client terminal 101) (step S1601), the server 103 searches the storage location that is designated by the request (step S1602). The server 103 then sends the business form print data through the network 104 to the image forming apparatus 102 (or the client terminal 101) that is the source of the request (step S1603).

Figure 16A:
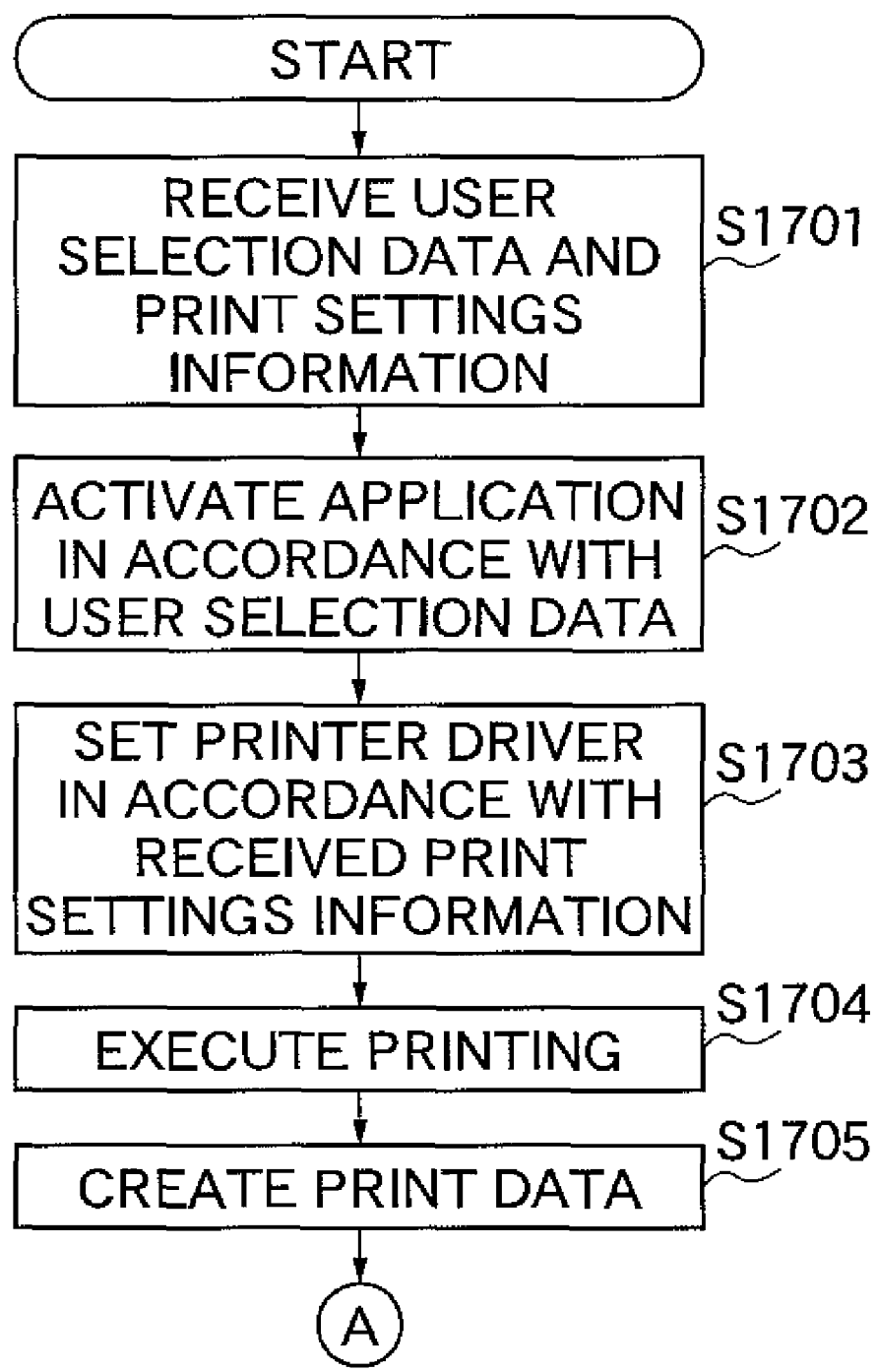
FIG. 16 is a flowchart showing the procedure of print data creation processing that is executed at the client terminal.
Figure 16B:
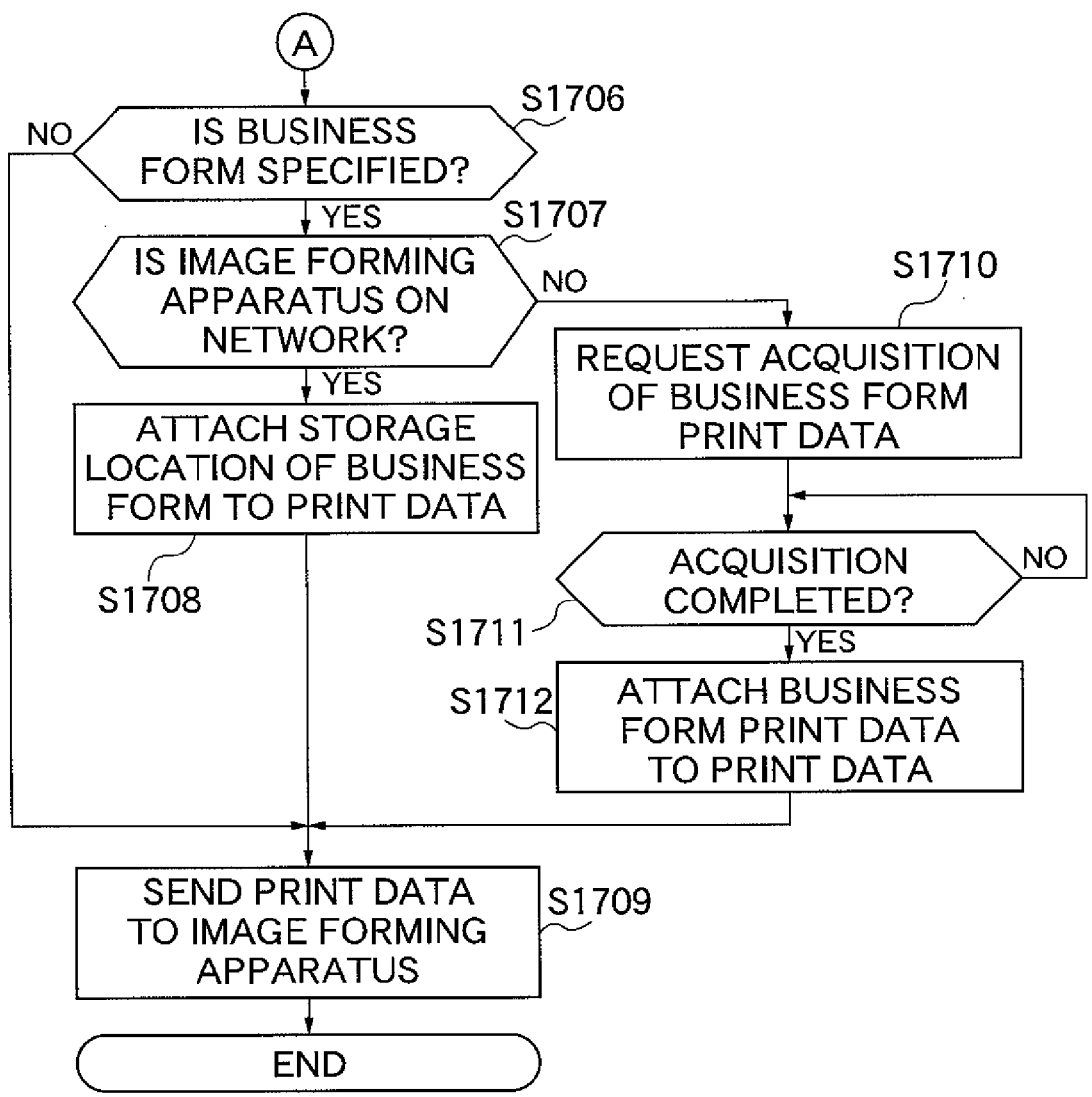

FIG. 16 is a flowchart showing the procedure of print data creation processing that is executed at the client terminal 101. This print data creation processing can be applied whether the printing system in which the server 103 is introduced is the printing system 1200 or the printing system 1300.

In FIG. 16, first, the client terminal 101 receives, with the network I/F 305, data that is sent from the server 103 through the network 104 (step S1701). In this case, the term "data that is sent from the server 103" refers to either the user selection data and print settings information 4b that is sent at step S1508 or the business form print data storage destination information and normal data 2' that is sent at step S1506.

Thereafter, the client terminal 101 activates an application in accordance with the user selection data (or user selection data included in the normal data) (step S1702). The client terminal 101 then sets the printer driver in accordance with the print settings information that is simultaneously sent from the server 103 with the user selection data (step S1703). The client terminal 101 then executes the print processing (step S1704), and creates print data (step S1705).

The client terminal 101 also determines whether or not there is a business form specification (step S1706). More specifically, when the data that is received at the aforementioned step S1701 is the business form print data storage destination information and normal data 2', the client terminal 101 determines that there is a business form specification. When the determination result is that there is a business form specification, the process proceeds to step S1707, and when the result is that there is no business form specification, the process proceeds to step S1709.

At step S1707, the client terminal 101 determines whether or not the image forming apparatus 102 is present on the network 104. If it is determined as a result that the image forming apparatus 102 is present on the network 104 (case of FIG. 12), the process proceeds to step S1708. In contrast, if it is determined that the image forming apparatus 102 is not connected to the network 104 (case of FIG. 13), the process proceeds to step S1710.

At step S1708 the client terminal 101 attaches business form print data storage destination information to the print data. Next, in step S1709, the client terminal 101 sends the print data 5 to the image forming apparatus 102 through the network 104 (see FIG. 12).

In contrast, at step S1710, the client terminal 101 sends the business form print data acquisition request 4'a to the server 103 through the network 104 based on the business form print data storage destination information (see FIG. 13). The business form print data is then sent from the server 103 by the processing shown in FIG. 15, and the client terminal 101 waits until acquisition thereof is completed (NO at step S1711). Upon completing acquisition of the business form print data (YES at step S1711), the client terminal 101 attaches the business form print data to the print data (step S1712) and sends this print data as the print data 5 to the image forming apparatus 102 through the local I/F 105 (step S1709, see FIG. 13).

Figure 17:
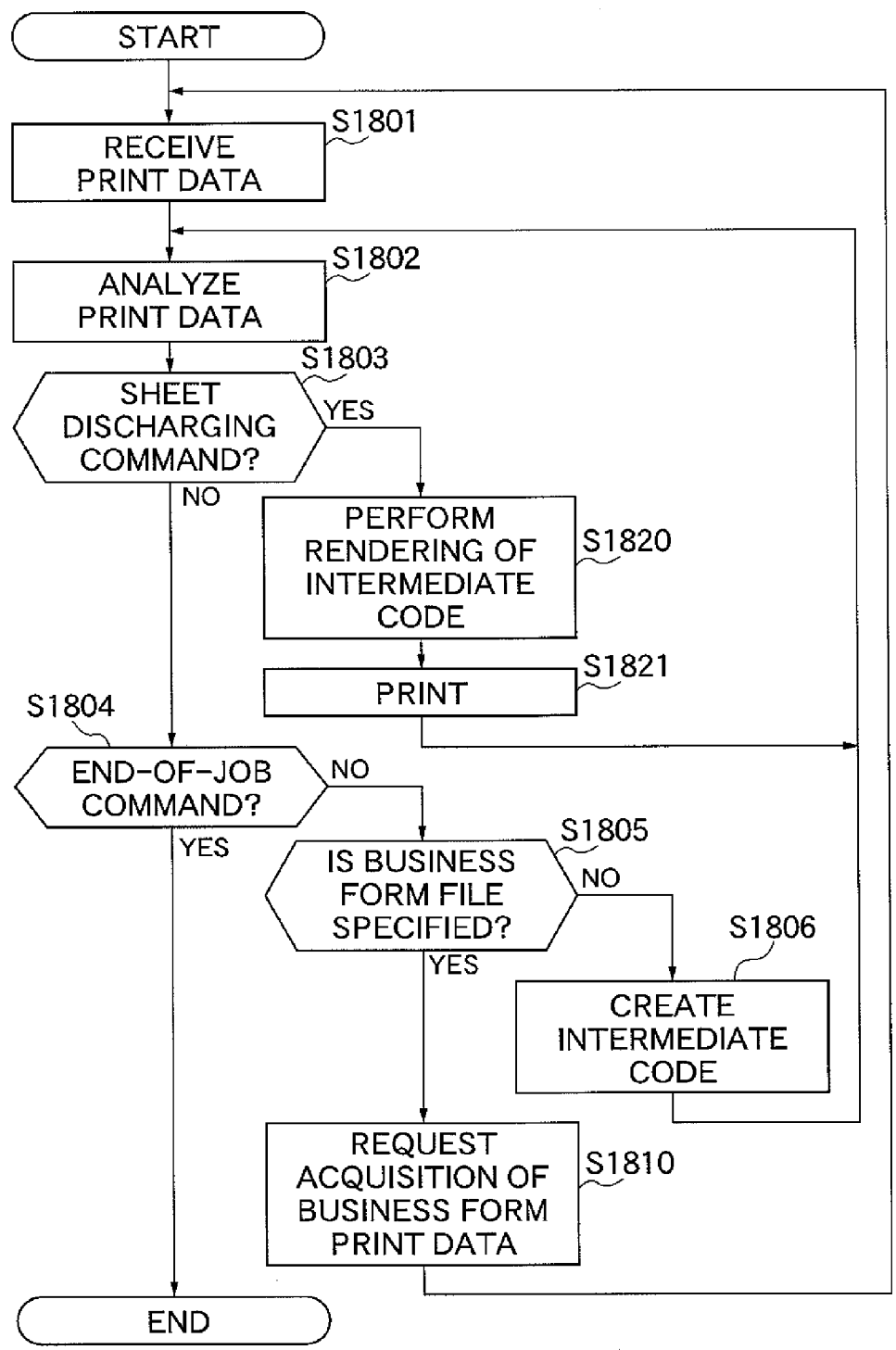
FIG. 17 is a flowchart showing the procedure of print processing that is executed at the image forming apparatus.

FIG. 17 is a flowchart showing the procedure of print processing that is executed at the image forming apparatus 102. This print processing can be applied whether the printing system in which the server 103 is introduced is the printing system 1200 or the printing system 1300.

In FIG. 17, first, the image forming apparatus 102 receives print data (5b, 5) through the network 104 or the local I/F 105 (step S1801, see FIG. 12 or FIG. 13) and stores the received print data in the reception buffer 204. Concurrently with reception of the print data, the image forming apparatus 102 reads out the print data that is stored in the reception buffer 204 and analyzes the print data (step S1802). The image forming apparatus 102 determines whether or not a command obtained by analyzing the print data is a sheet discharging command (step S1803). When it is determined as a result that the command is a sheet discharging command, the process proceeds to step S1820. When it is determined that the command is not a sheet discharging command, the process proceeds to step S1804.

At step S1804, the image forming apparatus 102 determines whether or not the command obtained by analyzing the print data is an end-of-job command (step S1804). When it is determined that the command is an end-of-job command, the present print processing is terminated. When it is determined that the command is not an end-of-job command, the process proceeds to step S1805.

At step S1805, the image forming apparatus 102 determines whether or not the command obtained by the analysis is a business form file specification. When it is determined that the command is a business form file specification, the process proceeds to step S1810. When it is determined that the command is not a business form file specification, the process proceeds to step S1806.

At step S1810, based on the business form print data storage destination information, as shown in FIG. 12, the image forming apparatus 102 sends the business form print data acquisition request 4' to the server 103 through the network 104, and then returns to step S1801.

In contrast, at step S1806 the image forming apparatus 102 creates an intermediate code and stores the intermediate code in the frame buffer 206. The process then returns to step S1802.

If it is determined that the command obtained by analysis is a sheet discharging command, the process proceeds to step S1820. At step S1820, the image forming apparatus 102 performs rendering for the intermediate code that is stored in the frame buffer 206, and stores the developed image that is obtained in the raster memory 207. Next, in the next step S1821, the image forming apparatus 102 transfers the developed image that is stored in the raster memory 207 to the printer engine 213 through the engine I/F 212, as shown in FIG. 5, to cause the printer engine 213 to perform printing. The process then returns to step S1802.

Thus, according to the second embodiment of the present invention, it is possible to divide the processing load by apportioning the processing for printing to the client terminal 101 and the server 103.

Although according to the second embodiment of the present invention a configuration is adopted in which the image forming apparatus 102 prints print data that includes business form data, in place thereof a configuration may be adopted in which the image forming apparatus 102 prints print data that employs information other than a business form as a template. Further, since time is required to transfer a portion of print data in which the data amount of images or the like is large, a configuration may be adopted in which the portion is processed at the server 103 and the other portions are processed at the client terminal 101.

Third Embodiment

Next, a third embodiment of the present invention will be described.

The system configuration of the third embodiment of the present invention is fundamentally the same as the configuration of the first embodiment of the present invention. Therefore, an explanation on different points therebetween will be given below, with explanations on structural elements denoted by the same reference numerals omitted.

In the third embodiment of the present invention, processing that is performed by the server 103 and the client terminal 101 when an operation error occurs during printing at the image forming apparatus 102 is described.

Figure 18:
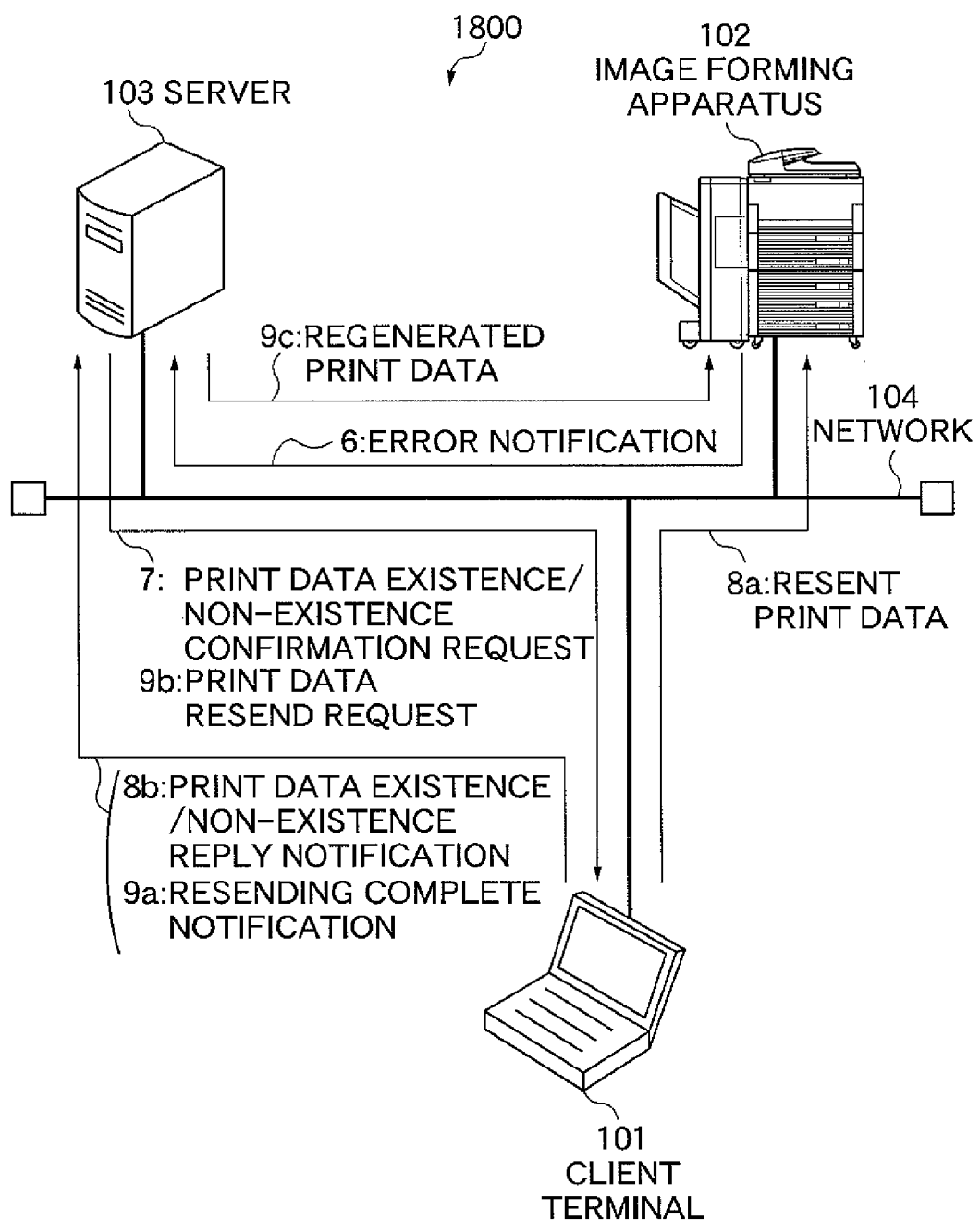
FIG. 18 is a block diagram showing the overall configuration of a printing system according to a third embodiment of the present invention.

FIG. 18 is a block diagram showing the overall configuration of a printing system according to the third embodiment of the present invention. The configuration of this printing system according to the third embodiment corresponds to the network configuration of the printing system 600 shown in FIG. 6.

In FIG. 18, in a printing system 1800, the server 103, the client terminal 101, and the image forming apparatus 102 are connected to each other through the network 104.

When the client terminal 101 sends the print data 5b to the image forming apparatus 102 to cause the image forming apparatus 102 to perform print processing, the client terminal 101 holds the print data 5b for a predetermined period after sending the print data 5b. When an error occurs, a print data existence/non-existence confirmation request 7, a print data resend request 9b, regenerated print data 9c and the like are sent through the network 104 from the server 103 to the client terminal 101. Further, a print data existence/non-existence reply notification 8, a resending complete notification 9a and the like are sent through the network 104 from the client terminal 101 to the server 103. The print data resend request 9c and resent print data 8a are sent through the network 104 to the image forming apparatus 102 from the server 103 or the client terminal 101. Further, an error notification 6 is sent from the image forming apparatus 102 to the server 103 through the network 104.

Figure 19:
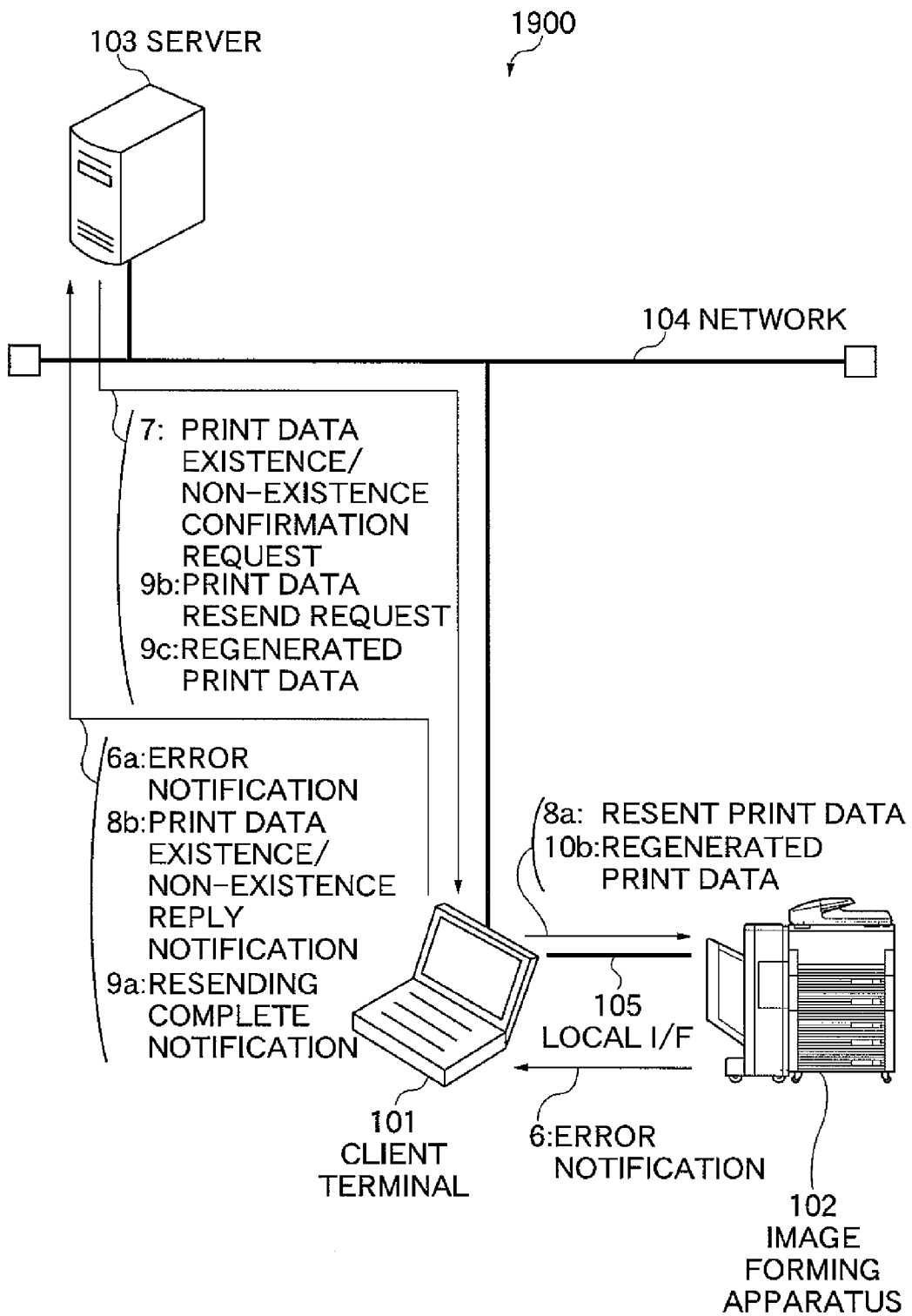
FIG. 19 is a block diagram showing a variation of the overall configuration of the printing system illustrated in FIG. 18.

FIG. 19 is a block diagram showing a variation of the overall configuration of the printing system 1900 illustrated in FIG. 18. The configuration of the printing system according to this variation corresponds to the network configuration of the printing system 700 illustrated in FIG. 7.

In FIG. 19, in a printing system 1900, the server 103 and the client terminal 101 are connected to each other through the network 104, and the image forming apparatus 102 is connected to the client terminal 101 through the local I/F 105.

The print data existence/non-existence confirmation request 7, the print data resend request 9b, the regenerated print data 9c and the like are sent from the server 103 to the client terminal 101 through the network 104. An error notification 6a, the print data existence/non-existence reply notification 8, a resending complete notification 9 and the like are sent through the network 104 from the client terminal 101 to the server 103. The resent print data 8a, regenerated print data 10b and the like are sent from the client terminal 101 to the image forming apparatus 102 through the local I/F 105. The error notification 6 and the like are sent from the image forming apparatus 102 to the client terminal 101 through the local I/F 105.

Figure 20:
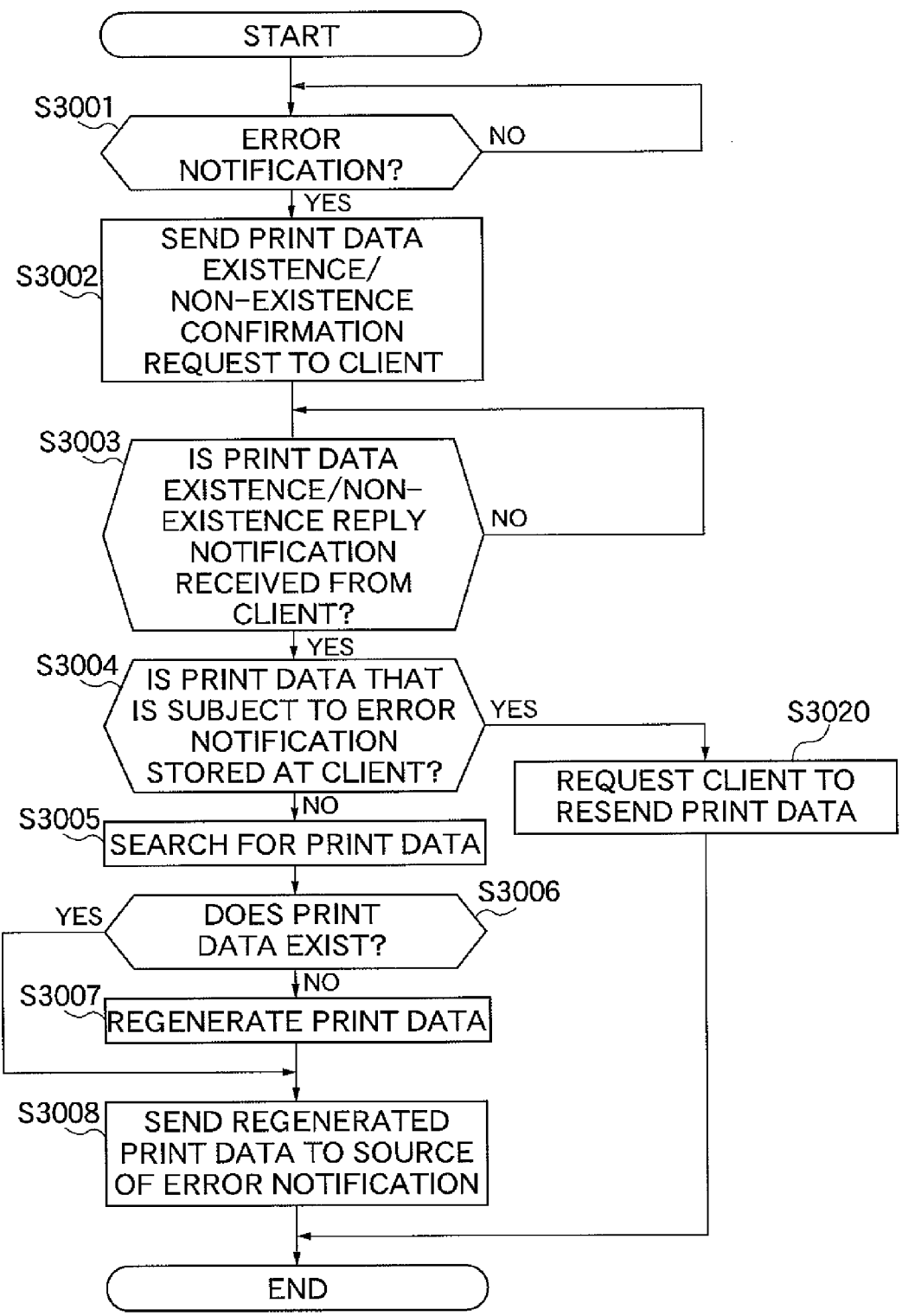
FIG. 20 is a flowchart showing the procedure of error processing that is performed at the server in the printing system according to the third embodiment.

FIG. 20 is a flowchart showing the procedure of error processing that is performed at the server 103 in the printing system according to the third embodiment. This error processing can be applied whether the printing system in which the server 103 is introduced is the printing system 1800 or the printing system 1900.

In FIG. 20, first, when an operation error occurs during printing at the image forming apparatus 102, the server 103 receives the error notification 6 directly from the image forming apparatus 102 (see FIG. 18) or the error notification 6a from the client terminal 101 (see FIG. 19) through the network 104 (YES at step S3001). In a case where the server 103 is introduced in the printing system 1900 shown in FIG. 19, the error notification 6 is previously sent to the client terminal 101 from the image forming apparatus 102. According to the present embodiment, when the image forming apparatus 102 performs printing, the image forming apparatus 102 issues a job ID each time print data (4a, 5b) is received from the server 103 or the client terminal 101. The image forming apparatus 102 attaches the job ID to the error notification when sending the error notification 6. The server 103 can thereby identify the print data that is subject to the error notification (6, 6a) that is received at step S3001. When sending the error notification 6, the image forming apparatus 102 may also attach information that can identify the page(s) that should be resent.

In order to confirm whether or not the print data that is subject to the error notification (6, 6a) is stored at the client terminal 101, the server 103 sends the print data existence/non-existence confirmation request 7 with respect to the print data that is subject to the error notification to the client terminal 101 through the network 104 (step S3002, see FIG. 18 and FIG. 19). The server 103 then waits for a reply from the client terminal 101 (NO at step S3003). Upon receiving the print data existence/non-existence reply notification 8b from the client terminal 101 (YES at step S3003, see FIG. 18 and FIG. 19), the server 103 determines whether or not the print data that is subject to the error notification is stored at the client terminal 101 based on the print data existence/non-existence reply notification 8b (step S3004). If the result indicates that the print data that is subject to the error notification is stored at the client terminal 101, the process proceeds to step S3020, and if not, the process proceeds to step S3005.

At step S3020, the server 103 sends the resend request 9b with respect to the print data in question to the client terminal 101 through the network 104 (step S3020, see FIG. 18 and FIG. 19). Then the present error processing is terminated.

In contrast, at step S3005, the server 103 examines whether or not the print data in question exists at the server 103. If the result indicates that the print data is exists at the server 103 (YES at step S3006), the process proceeds to step S3008, and if not (NO at step S3006), the process proceeds to step S3007.

At step S3007, the server 103 regenerates the print data.

At step S3008, the server 103 sends the regenerated print data 9c through the network 104 to the client terminal 101 (case of FIG. 19) or the image forming apparatus 102 (case of FIG. 18) that is the source of the error notification (step S3008, see FIG. 18 and FIG. 19). Then the present error processing is terminated.

Figure 21:
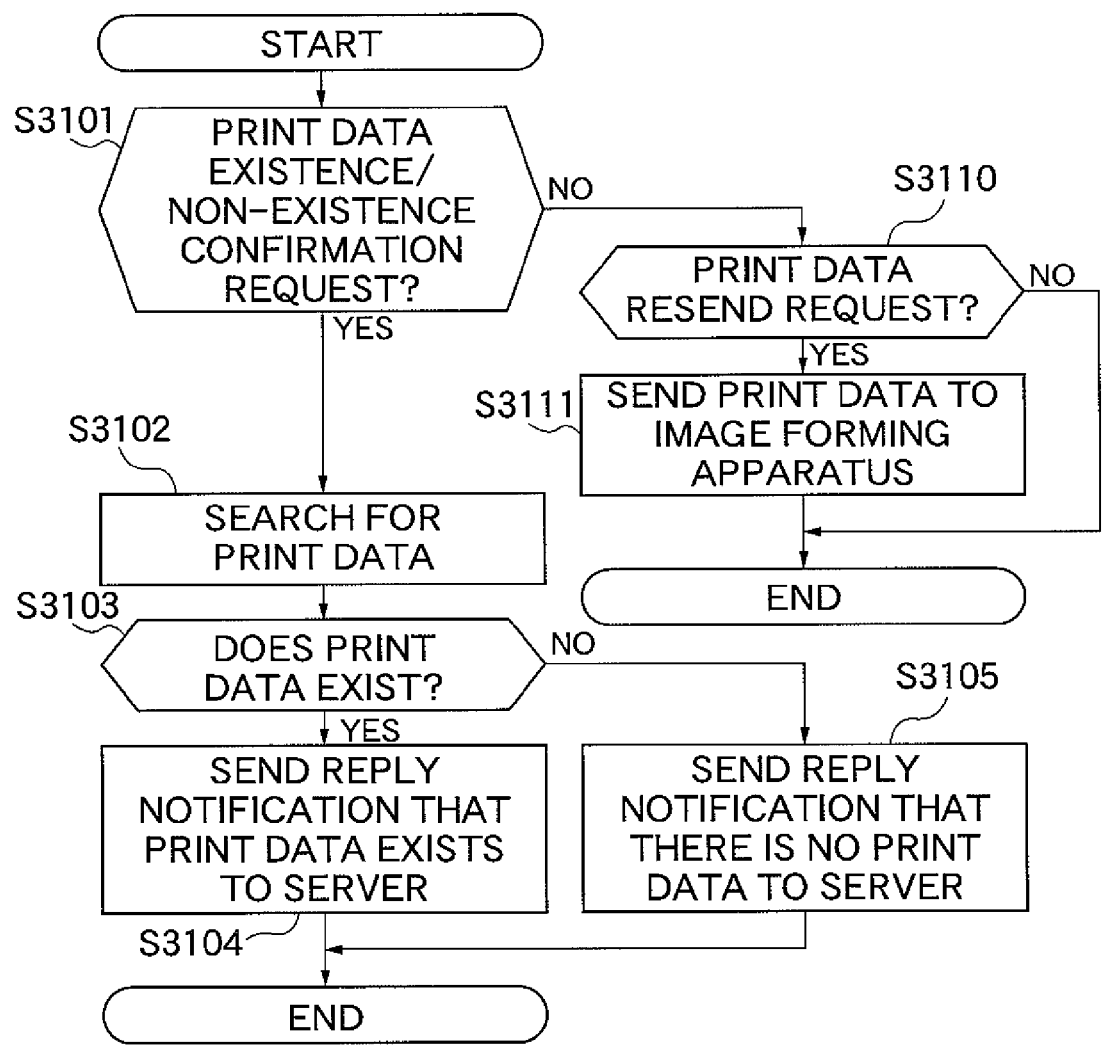
FIG. 21 is a flowchart showing the procedure of print data confirmation and print data resending processing that is performed at the client terminal.

FIG. 21 is a flowchart showing the procedure of print data confirmation and print data resending processing that is performed at the client terminal 101. This print data resending processing can be applied whether the printing system in which the server 103 is introduced is the printing system 1800 or the printing system 1900.

In FIG. 21, first, upon receiving with the network I/F 305 data that is sent from the server 103 through the network 104, the client terminal 101 determines whether or not the data that is received is the print data existence/non-existence confirmation request 7 (step S3101). If the result indicates that the data is the print data existence/non-existence confirmation request 7, the process proceeds to step S3102. If the result indicates that the data that is received is not the print data existence/non-existence confirmation request 7, the process proceeds to step S3110.

At step S3102, the client terminal 101 examines whether or not the print data relating to the print data existence/non-existence confirmation request 7 in question exists at the client terminal 101. If the result indicates that the print data exists at the client terminal 101 the process proceeds to step S3104, and if not, the process proceeds to step S3105.

At step S3104, as the print data existence/non-existence reply notification 8b, the client terminal 101 sends a notification that the print data in question exists at the client terminal 101 to the server 103 through the network 104.

At step S3105, as the print data existence/non-existence reply notification 8b, the client terminal 101 sends a notification that the print data in question does not exist at the client terminal 101 to the server 103 through the network 104.

Further, at step S3110 the client terminal 101 determines whether or not the data that is received through the network 104 is the print data resend request 9b. If the result of that determination indicates that the data is the print data resend request 9b the process proceeds to step S3111. In contrast, if the result indicates that the data is not the print data resend request 9b, the present processing is terminated.

At step S3111, the client terminal 101 sends the resent print data 8a to the image forming apparatus 102 through the network 104 (see FIG. 18) or through the local I/F 105 (see FIG. 19). Then the present processing is terminated. In this case, the resent print data 8a is data that is retrieved from print data stored in the client terminal 101.

Figure 22:
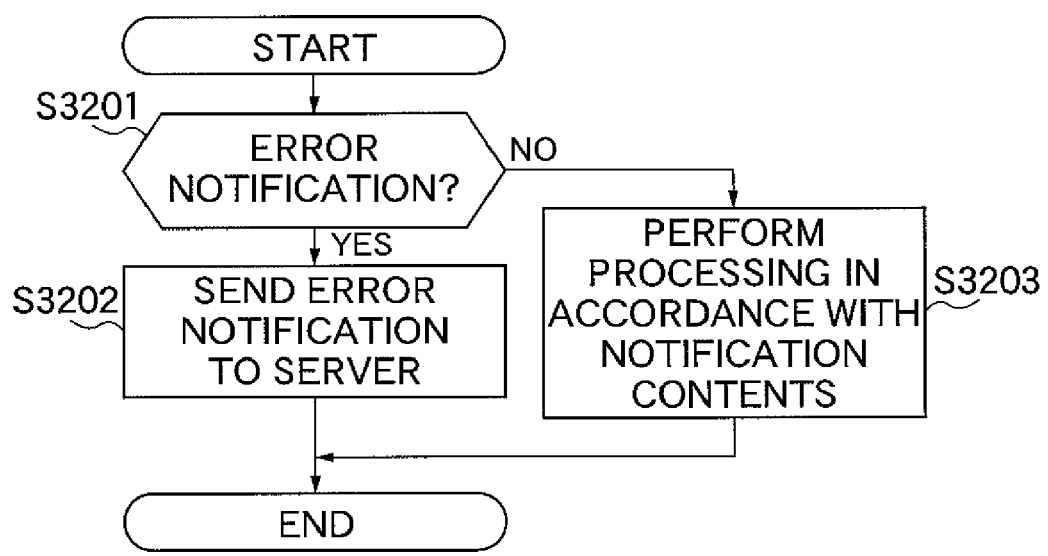
FIG. 22 is a flowchart showing the procedure of error notification processing that is performed at the client terminal.

FIG. 22 is a flowchart showing the procedure of error notification processing that is performed at the client terminal 101. This error notification processing can be applied when the printing system in which the server 103 is introduced is the printing system 1900.

In FIG. 22, first, upon receiving data from the image forming apparatus 102 through the local I/F 105, the client terminal 101 determines whether or not the data that is received is the error notification 6 (step S3201, see FIG. 19). When it is determined as a result that the data is the error notification 6, the process proceeds to step S3202. When it is determined that the data is not the error notification 6 the process proceeds to step S3203.

At step S3202, the client terminal 101 sends the error notification 6 that is received to the server 103 as the error notification 6a through the network 104 (step S3202).

At step S3203, the client terminal 101 performs processing in accordance with the contents of the data that is received. Then the present error notification processing is terminated.

As described above, according to the third embodiment of the present invention, upon occurrence of a printing error, if the print data remains at the client terminal 101 the print data is sent from the client terminal 101. As a result, the server 103 can omit processing to regenerate the print data to thus reduce the processing load of the server 103.

Fourth Embodiment

Next, a fourth embodiment of the present invention will be described.

The system configuration of the fourth embodiment of the present invention is fundamentally the same as the configuration of the first embodiment of the present invention. Therefore, an explanation on different points therebetween will be given below, with explanations on structural elements denoted by the same reference numerals omitted.

In the fourth embodiment of the present invention, the server 103 performs in part of print processing to create intermediate code or the like and transfers an intermediate code that is created to the client terminal 101. The client terminal 101 converts the intermediate code that is transferred into print data, and transfers the print data to the image forming apparatus 102.

Figure 23:
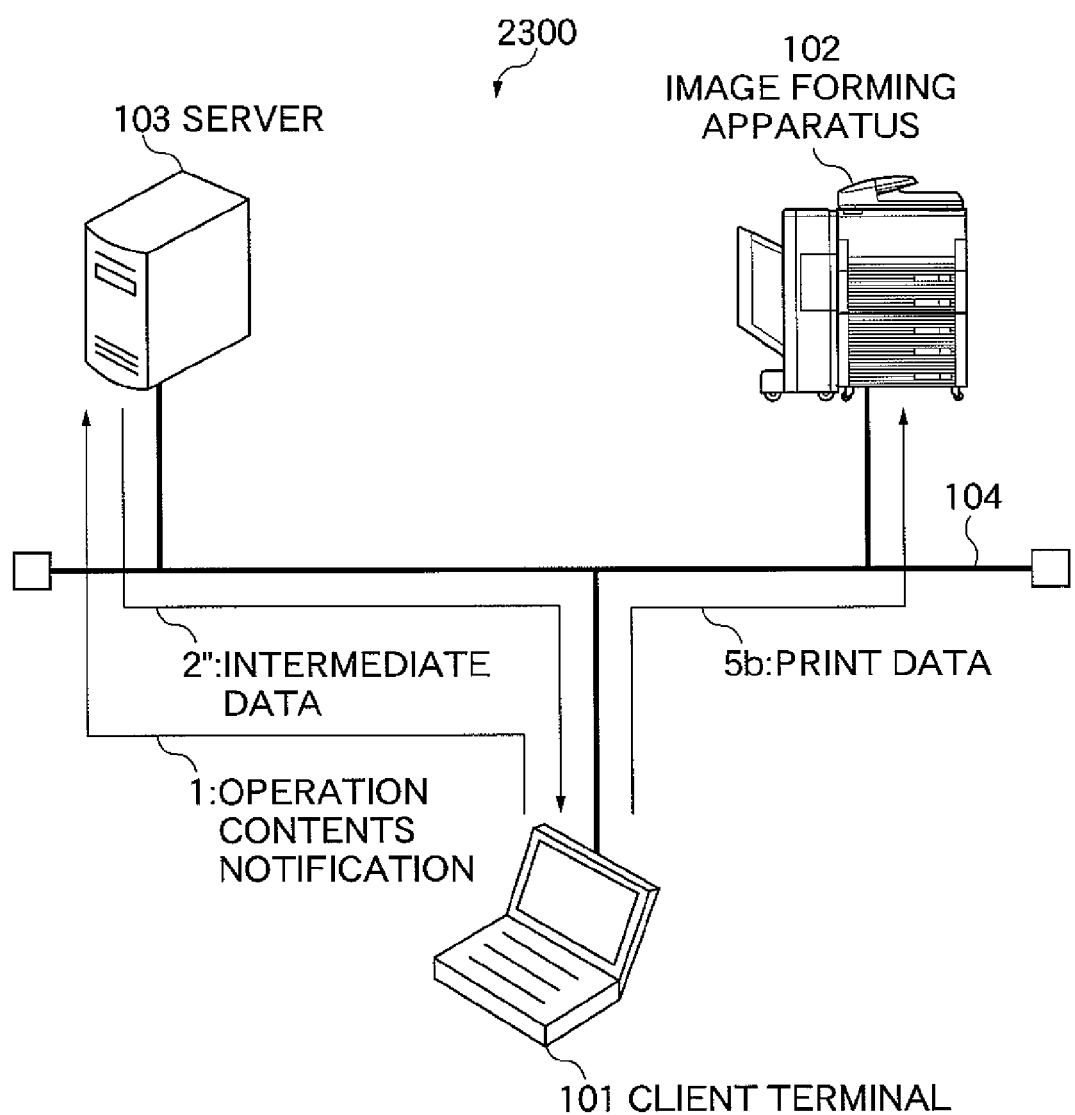
FIG. 23 is a block diagram showing the overall configuration of a printing system according to a fourth embodiment of the present invention.

FIG. 23 is a block diagram showing the overall configuration of a printing system according to the fourth embodiment of the present invention. The configuration of the printing system according to the fourth embodiment corresponds to the network configuration of the printing system 600 shown in FIG. 6.

In FIG. 23, in a printing system 2300, the server 103, the client terminal 101, and the image forming apparatus 102 are connected to each other through the network 104.

Intermediate data 2" is sent from the server 103 to the client terminal 101 through the network 104. The operation contents notification 1 is sent from the client terminal 101 to the server 103 through the network 104. Further, the print data 5b is sent from the client terminal 101 to the image forming apparatus 102 through the network 104.

Figure 24:
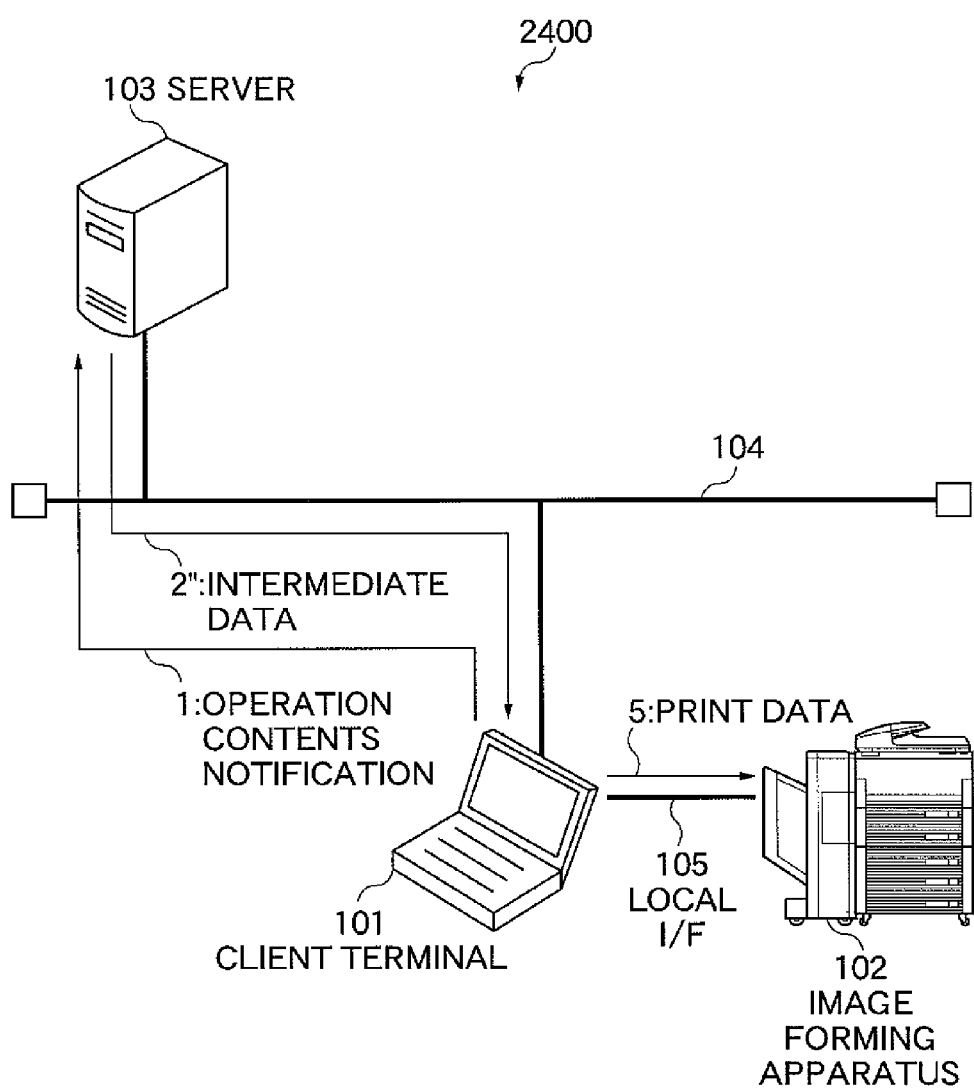
FIG. 24 is a block diagram showing a variation of the overall configuration of the printing system illustrated in FIG. 23.
Figure 25:
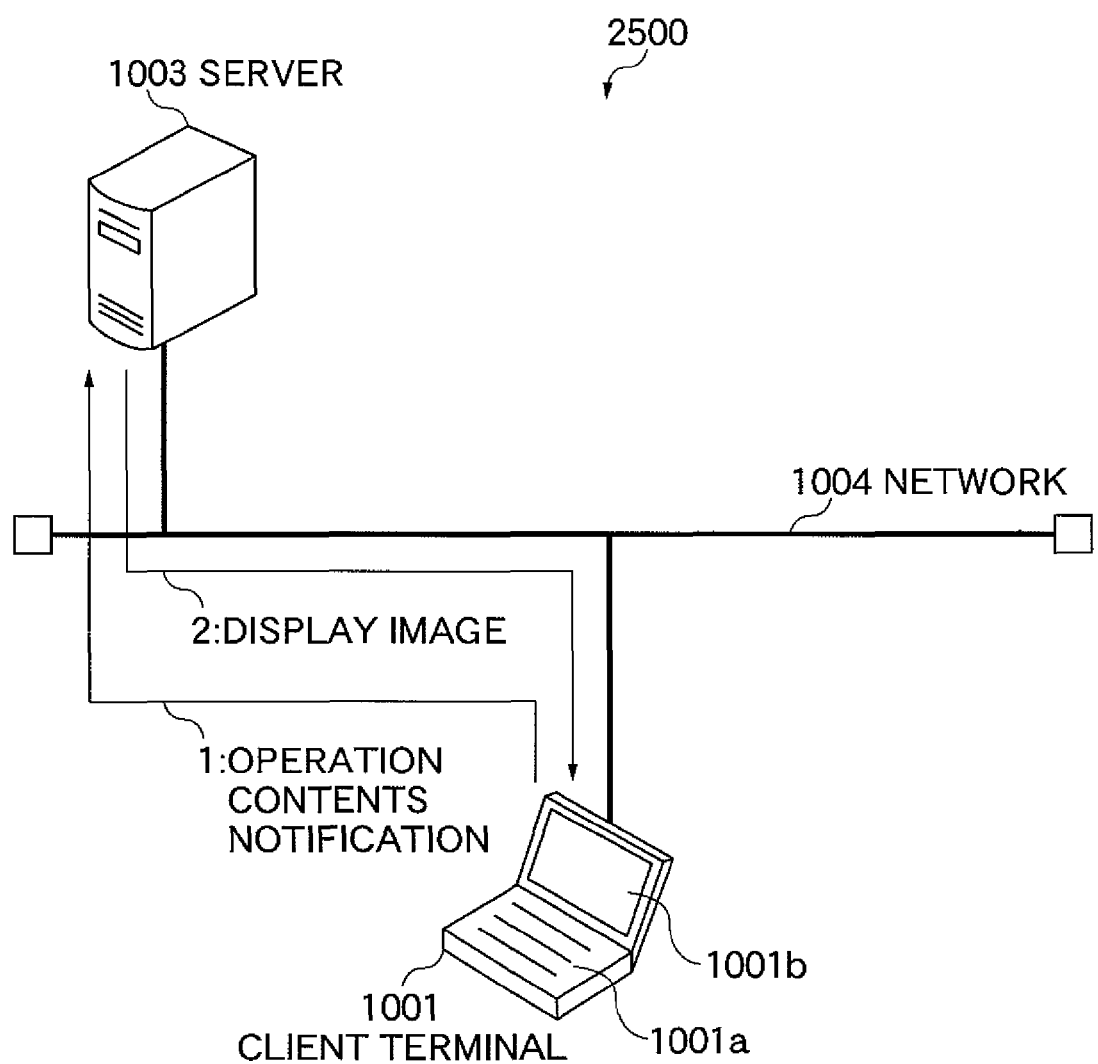
FIG. 25 is a view showing the conventional configuration of the SBC system.
Figure 26:
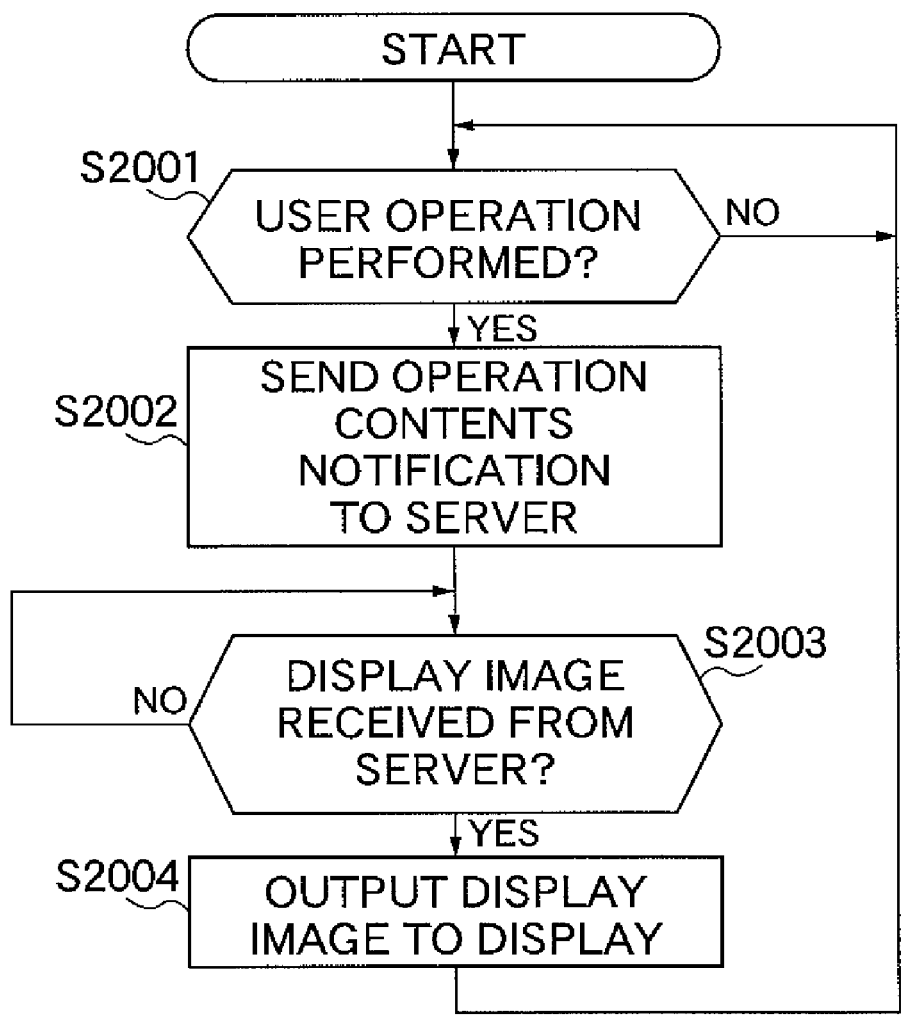
FIG. 26 is a flowchart showing the procedure of basic processing that is executed at the client terminal in the SBC system illustrated in FIG. 25.
Figure 27:
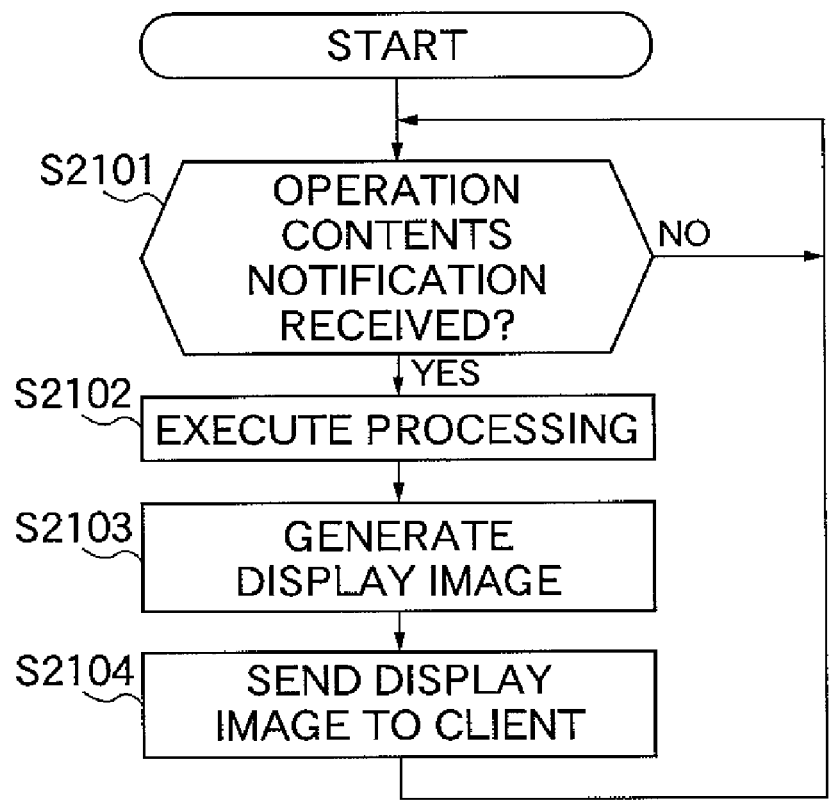
FIG. 27 is a flowchart showing the procedure of basic processing that is executed at the server in the SBC system.
Figure 28:
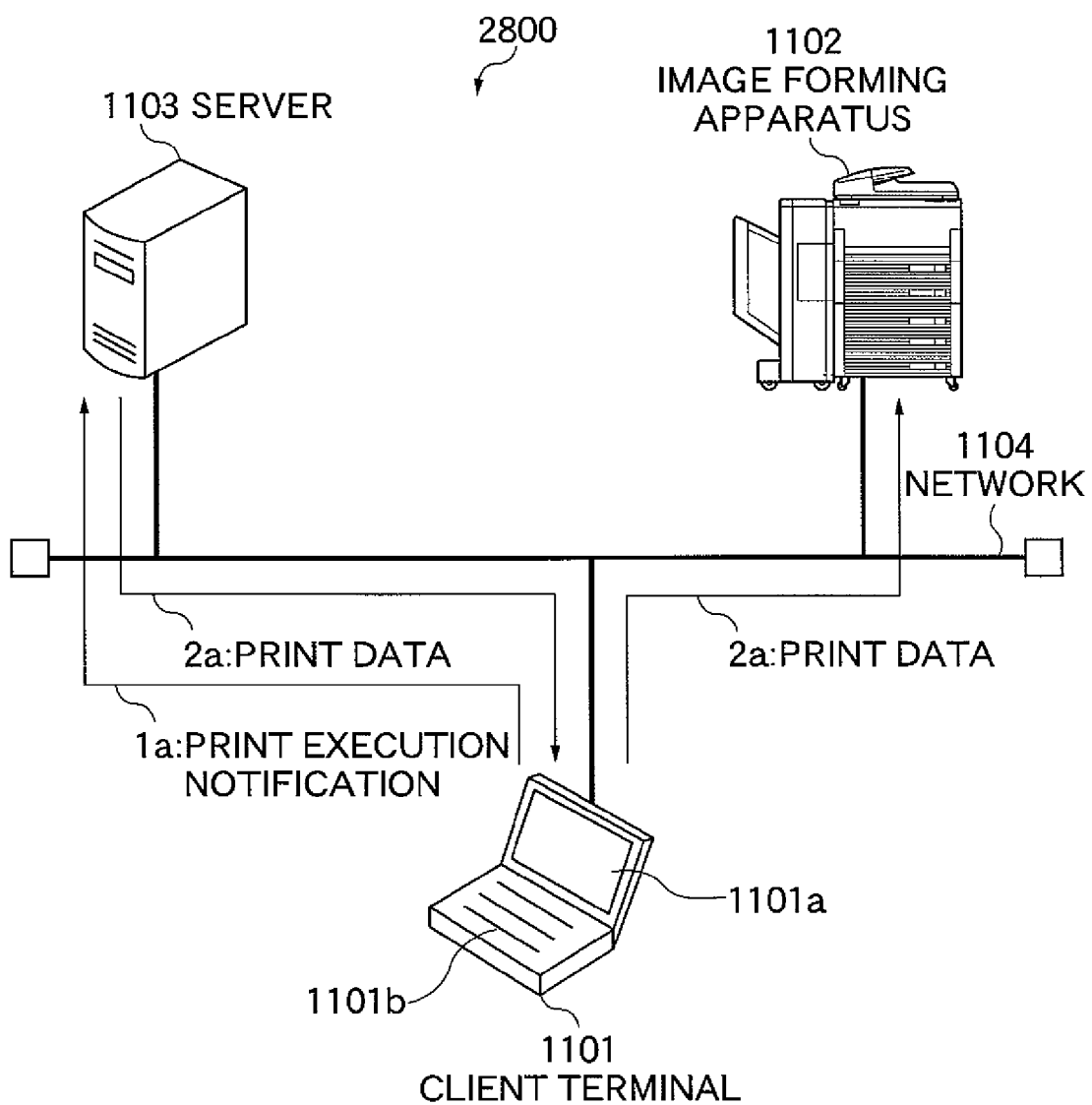
FIG. 28 is a view showing a variation of the conventional configuration of the SBC system.

FIG. 24 is a block diagram showing a variation of the overall configuration of the printing system 2300 illustrated in FIG. 23. The configuration of the printing system according to the variation corresponds to the network configuration of the printing system 700 illustrated in FIG. 7.

In FIG. 24, first, in the printing system 2400, the server 103 and the client terminal 101 are connected to each other through the network 104, and the image forming apparatus 102 is connected to the client terminal 101 through the local I/F 105.

The intermediate data 2" is sent from the server 103 to the client terminal 101 through the network 104. The operation contents notification 1 is sent from the client terminal 101 to the server 103 through the network 104. Further, the print data 5 is sent from the client terminal 101 to the image forming apparatus 102 through the local I/F 105.

Thus, the processing load at the server 103 can be reduced.

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitutes the present invention.

Examples of the storage medium for supplying the program code include a floppy (registered trademark) disk, a hard disk, a magnetic-optical disk, optical disks such as a CD-ROM, a CD-R, a CD-RW, a DVD-ROM, a DVD-RAM, a DVD-RW, a DVD+RW, a magnetic tape, a non-volatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Moreover, it is to be understood that the functions of any of the above described embodiments may be accomplished not only by executing a program code read out by a computer, but also by causing an OS (operating system) running on the computer to perform part or all of the actual operations based on instructions in the program code.

In this case, the program code may be supplied directly from a storage medium on which the program code is stored, or may be supplied by downloading from a computer, database, or the like, not shown, that is connected to the Internet, a commercial network, a local area network, or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-159991 filed Jun. 8, 2006, which is hereby incorporated by reference herein in its entirety.

What is claimed is:

1. A printing system comprising:
an image forming apparatus;
a server having a print-related information sending unit, a first generation unit, a first sending unit, and a second sending unit; and
a client terminal having a print execution requesting unit, a judging unit, a judgment result sending unit, a second generation unit, and a third sending unit,
wherein the print execution requesting unit is adapted to specify data among data stored in the server, and send a print execution request to the server,
wherein the print-related information sending unit is adapted to receive the print execution request sent by the print execution requesting unit, and send print-related information relating to the specified data to the client terminal,
wherein the judging unit is adapted to receive the print-related information sent by the print-related information sending unit, and judge whether or not the client terminal is able to generate print data with the specified data based on the print-related information,
wherein the judgment result sending unit is adapted to send a judgment result obtained by the judging unit to the server,
wherein the first generation unit is adapted to, in a case where the judging unit judges that the client terminal is unable to generate print data with the specified data, generate print data based on the specified data,
wherein the first sending unit is adapted to send the print data generated by the first generation unit to the image forming apparatus,
wherein the second sending unit is adapted to, in a case where the judging unit judges that the client terminal is able to generate print data with the specified data, send the specified data to the client terminal,
wherein the second generation unit is adapted to generate print data based on the specified data sent by the second sending unit, and
wherein the third sending unit is adapted to send the print data generated by the second generation unit to the image forming apparatus.

2. The printing system as claimed in claim 1, wherein the print-related information includes at least one information selected from the group consisting of print settings information, identification information of an application program used to create the specified data, and a data amount of the specified data.

3. The printing system as claimed in claim 1, wherein, based on the print-related information sent by the print-related information sending unit, the judging unit performs at least one judgment selected from the group consisting of a judgment as to whether or not an image development mode is specified, a judgment as to whether or not an application program that is able to generate the print data based on the specified data at the client terminal exists, and a judgment as to whether or not the specified data is of an amount for which the client terminal is able to perform print data generation processing.

4. The printing system as claimed in claim 1, wherein the second sending unit sends the specified data and print settings information relating to the specified data to the client terminal in a case where the judging unit judges that the client terminal is able to generate print data with the specified data.

5. A print processing method for a printing system having a client terminal, a server, and an image forming apparatus, the method comprising:
a print execution requesting step of specifying data among data stored in the server at the client terminal, and sending a print execution request from the client terminal to the server;
a print-related information sending step of, upon receiving the print execution request sent in the print execution requesting step at the server, sending print-related information relating the specified data to the client terminal;

a judging step of, upon receiving the print-related information sent in the print-related information sending step at the client terminal, based on the print-related information, judging whether or not the client terminal is able to generate print data with the specified data based on the related information;

a judgment result sending step of sending a judgment result obtained in the judging step from the client terminal to the server;

a first generation step of, in a case where the judging step judges that the client terminal is unable to generate print data with the specified data, generating print data based on the specified data;

a first sending step of sending the print data generated in the first generation step to the image forming apparatus;

a second sending step of, in a case where the judging step judges that the client terminal is able to generate print data with the specified data, sending the specified data to the client terminal;

a second generation step of generating print data based on the specified data sent in the second sending step; and a third sending step of sending the print data generated in the second generation step to the image forming apparatus.

6. A non-transitory computer readable storage medium storing a computer program executable by a computer to execute a print processing method for a printing system having a client terminal, a server, and an image forming apparatus, the computer program comprising:

a print execution requesting module for specifying data among data stored in the server at the client terminal, and sending a print execution request from the client terminal to the server;

a print-related information sending module for, upon receiving the print execution request sent by the print execution requesting module at the server, sending the print-related information relating to the specified data to the client terminal;

a judging module for, upon receiving the print-related information sent in the print-related information sending module at the client terminal, based on the print-related information, judging whether or not the client terminal is able to generate print data with the specified data based on the related information;

a judgment result sending module for sending a judgment result obtained by the judging module from the client terminal to the server;

a first generation module for, in a case where the judging module judges that the client terminal is unable to generate print data with the specified data, generating print data based on the specified data;

a first sending module for sending the print data generated by the first generation module to the image forming apparatus;

a second sending module for, in a case where the judging module judges that the client terminal is able to generate print data with the specified data, sending the specified data to the client terminal;

a second generation module for generating print data based on the specified data sent by the second sending module; and a third sending module for sending the print data generated by the second generation module to the image forming apparatus.

* * * * *